(12) United States Patent
Wedul et al.

(10) Patent No.: US 12,446,887 B2
(45) Date of Patent: Oct. 21, 2025

(54) MEDICAL SYSTEM FOR TREATING A LEFT ATRIAL APPENDAGE

(71) Applicant: BOSTON SCIENTIFIC SCIMED, INC., Maple Grove, MN (US)

(72) Inventors: Eric Wedul, Minneapolis, MN (US); Keith R. Maile, New Brighton, MN (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 600 days.

(21) Appl. No.: 17/575,154

(22) Filed: Jan. 13, 2022

(65) Prior Publication Data

US 2022/0218355 A1    Jul. 14, 2022

Related U.S. Application Data

(60) Provisional application No. 63/137,387, filed on Jan. 14, 2021.

(51) Int. Cl.
| | |
|---|---|
| *A61B 17/12* | (2006.01) |
| *A61B 17/00* | (2006.01) |
| *A61B 90/00* | (2016.01) |

(52) U.S. Cl.
CPC .. *A61B 17/12122* (2013.01); *A61B 17/12131* (2013.01); *A61B 2017/00022* (2013.01);
(Continued)

(58) Field of Classification Search
CPC .... A61B 2017/12095; A61B 2090/064; A61B 2017/00022; A61B 2017/00575;
(Continued)

(56) References Cited

U.S. PATENT DOCUMENTS

| 178,283 A | 6/1876 | French |
|---|---|---|
| 1,967,318 A | 7/1934 | Monahan |
(Continued)

FOREIGN PATENT DOCUMENTS

| CN | 1399571 A | 2/2003 |
|---|---|---|
| CN | 202143640 U | 2/2012 |
(Continued)

OTHER PUBLICATIONS

International Search Report and Written Opinion dated Oct. 13, 2020 for International Application No. PCT/US2020/048437.
(Continued)

*Primary Examiner* — Elizabeth Houston
*Assistant Examiner* — Daniel Icet
(74) *Attorney, Agent, or Firm* — Seager, Tufte & Wickhem LLP

(57) ABSTRACT

A medical system may include a left atrial appendage closure device including an expandable framework and a proximal hub disposed along a central longitudinal axis of the expandable framework, the expandable framework being configured to shift between a collapsed delivery configuration and an expanded deployed configuration; wherein the left atrial appendage closure device includes a sensor at least partially disposed within an interior of the expandable framework and axially movable relative to the proximal hub; wherein the proximal hub includes a first threaded connection structure; and a delivery catheter including a core wire extending axially within a lumen of the delivery catheter, the core wire having a second threaded connection structure at a distal end thereof configured to releasably engage the first threaded connection structure in an unreleased configuration and the second threaded connection structure is disengaged from the first threaded connection structure in a released configuration.

14 Claims, 16 Drawing Sheets

(52) U.S. Cl.
CPC ............... *A61B 2017/00292* (2013.01); *A61B 2017/12081* (2013.01); *A61B 2017/12095* (2013.01); *A61B 2090/064* (2016.02)

(58) Field of Classification Search
CPC ..................... A61B 17/12022–12195; A61B 17/12019–12118; A61B 17/3468; A61F 2/2427–2439
See application file for complete search history.

(56) References Cited

U.S. PATENT DOCUMENTS

| | | |
|---|---|---|
| 3,402,710 A | 9/1968 | Paleschuck |
| 3,540,431 A | 11/1970 | Mobin-Uddin |
| 3,557,794 A | 1/1971 | Van Patten |
| 3,638,652 A | 2/1972 | Kelley |
| 3,811,449 A | 5/1974 | Gravlee et al. |
| 3,844,302 A | 10/1974 | Klein |
| 3,874,388 A | 4/1975 | King et al. |
| 4,007,743 A | 2/1977 | Blake |
| 4,108,420 A | 8/1978 | West et al. |
| 4,175,545 A | 11/1979 | Termanini |
| 4,309,776 A | 1/1982 | Berguer |
| 4,341,218 A | 7/1982 | Ü |
| 4,364,392 A | 12/1982 | Strother et al. |
| 4,425,908 A | 1/1984 | Simon |
| 4,545,367 A | 10/1985 | Tucci |
| 4,585,000 A | 4/1986 | Hershenson |
| 4,603,693 A | 8/1986 | Conta et al. |
| 4,611,594 A | 9/1986 | Grayhack et al. |
| 4,619,246 A | 10/1986 | Molgaard-Nielsen et al. |
| 4,638,803 A | 1/1987 | Rand et al. |
| 4,665,906 A | 5/1987 | Jervis |
| 4,681,588 A | 7/1987 | Ketharanathan et al. |
| 4,710,192 A | 12/1987 | Liotta et al. |
| 4,718,417 A | 1/1988 | Kittrell et al. |
| 4,759,348 A | 7/1988 | Cawood et al. |
| 4,781,177 A | 11/1988 | Lebigot |
| 4,793,348 A | 12/1988 | Palmaz |
| 4,827,907 A | 5/1989 | Tashiro |
| 4,832,055 A | 5/1989 | Palestrant |
| 4,873,978 A | 10/1989 | Ginsburg |
| 4,917,089 A | 4/1990 | Sideris |
| 4,921,484 A | 5/1990 | Hillstead |
| 4,960,412 A | 10/1990 | Fink |
| 4,966,150 A | 10/1990 | Etienne et al. |
| 4,998,972 A | 3/1991 | Chin et al. |
| 5,037,810 A | 8/1991 | Saliba, Jr. |
| 5,041,090 A | 8/1991 | Scheglov et al. |
| 5,041,093 A | 8/1991 | Chu |
| 5,042,707 A | 8/1991 | Taheri |
| 5,053,009 A | 10/1991 | Herzberg |
| 5,064,435 A | 11/1991 | Porter |
| 5,071,407 A | 12/1991 | Termin et al. |
| 5,078,736 A | 1/1992 | Behl |
| 5,098,440 A | 3/1992 | Hillstead |
| 5,108,418 A | 4/1992 | Lefebvre |
| 5,108,420 A | 4/1992 | Marks |
| 5,108,474 A | 4/1992 | Riedy et al. |
| 5,116,360 A | 5/1992 | Pinchuk et al. |
| 5,122,136 A | 6/1992 | Guglielmi et al. |
| 5,171,259 A | 12/1992 | Inoue |
| 5,171,383 A | 12/1992 | Sagaye et al. |
| 5,176,692 A | 1/1993 | Wilk et al. |
| 5,192,301 A | 3/1993 | Kamiya et al. |
| 5,211,658 A | 5/1993 | Clouse |
| 5,234,458 A | 8/1993 | Metais |
| 5,256,146 A | 10/1993 | Ensminger et al. |
| 5,258,000 A | 11/1993 | Gianturco |
| 5,258,042 A | 11/1993 | Mehta |
| 5,279,539 A | 1/1994 | Bohan et al. |
| 5,284,488 A | 2/1994 | Sideris |
| 5,304,184 A | 4/1994 | Hathaway et al. |
| 5,306,234 A | 4/1994 | Johnson |
| 5,312,341 A | 5/1994 | Turi |
| 5,329,942 A | 7/1994 | Gunther et al. |
| 5,334,217 A | 8/1994 | Das |
| 5,344,439 A | 9/1994 | Otten |
| 5,350,398 A | 9/1994 | Pavcnik et al. |
| 5,350,399 A | 9/1994 | Erlebacher et al. |
| 5,353,784 A | 10/1994 | Nady-Mohamed |
| 5,366,460 A | 11/1994 | Eberbach |
| 5,366,504 A | 11/1994 | Andersen et al. |
| 5,370,657 A | 12/1994 | Irie |
| 5,375,612 A | 12/1994 | Cottenceau et al. |
| 5,397,331 A | 3/1995 | Himpens et al. |
| 5,397,355 A | 3/1995 | Marin et al. |
| 5,409,444 A | 4/1995 | Kensey et al. |
| 5,417,699 A | 5/1995 | Klein et al. |
| 5,421,832 A | 6/1995 | Lefebvre |
| 5,425,744 A | 6/1995 | Fagan et al. |
| 5,427,119 A | 6/1995 | Swartz et al. |
| 5,433,727 A | 7/1995 | Sideris |
| 5,443,454 A | 8/1995 | Tanabe et al. |
| 5,443,478 A | 8/1995 | Purdy et al. |
| 5,451,235 A | 9/1995 | Lock et al. |
| 5,454,365 A | 10/1995 | Bonutti |
| 5,464,408 A | 11/1995 | Duc |
| 5,469,867 A | 11/1995 | Schmitt |
| 5,490,856 A | 2/1996 | Person et al. |
| 5,497,774 A | 3/1996 | Swartz et al. |
| 5,499,975 A | 3/1996 | Cope et al. |
| 5,499,995 A | 3/1996 | Teirstein |
| 5,522,790 A | 6/1996 | Voll et al. |
| 5,522,822 A | 6/1996 | Phelps et al. |
| 5,522,836 A | 6/1996 | Palermo |
| 5,527,322 A | 6/1996 | Klein et al. |
| 5,527,338 A | 6/1996 | Purdy |
| 5,558,093 A | 9/1996 | Pomeranz et al. |
| 5,558,652 A | 9/1996 | Henke |
| 5,569,204 A | 10/1996 | Cramer et al. |
| 5,591,196 A | 1/1997 | Marin et al. |
| 5,614,204 A | 3/1997 | Cochrum |
| 5,634,936 A | 6/1997 | Linden et al. |
| 5,634,942 A | 6/1997 | Chevillon et al. |
| 5,637,097 A | 6/1997 | Yoon |
| 5,643,282 A | 7/1997 | Kieturakis |
| 5,643,292 A | 7/1997 | Hart |
| 5,649,953 A | 7/1997 | Lefebvre |
| 5,653,690 A | 8/1997 | Booth et al. |
| 5,662,671 A | 9/1997 | Barbut et al. |
| 5,669,933 A | 9/1997 | Simon et al. |
| 5,681,345 A | 10/1997 | Euteneuer |
| 5,681,347 A | 10/1997 | Cathcart et al. |
| 5,683,411 A | 11/1997 | Kavteladze et al. |
| 5,690,671 A | 11/1997 | McGurk et al. |
| 5,693,067 A | 12/1997 | Purdy |
| 5,695,525 A | 12/1997 | Mulhauser et al. |
| 5,700,285 A | 12/1997 | Myers et al. |
| 5,702,421 A | 12/1997 | Schneidt |
| 5,704,910 A | 1/1998 | Humes |
| 5,709,224 A | 1/1998 | Behl et al. |
| 5,709,704 A | 1/1998 | Nott et al. |
| 5,709,707 A | 1/1998 | Lock et al. |
| 5,722,400 A | 3/1998 | Ockuly et al. |
| 5,724,975 A | 3/1998 | Negus et al. |
| 5,725,512 A | 3/1998 | Swartz et al. |
| 5,725,552 A | 3/1998 | Kotula et al. |
| 5,725,568 A | 3/1998 | Hastings |
| 5,733,294 A | 3/1998 | Forber et al. |
| 5,733,302 A | 3/1998 | Myler et al. |
| 5,735,290 A | 4/1998 | Sterman et al. |
| 5,749,880 A | 5/1998 | Banas et al. |
| 5,749,883 A | 5/1998 | Halpern |
| 5,749,894 A | 5/1998 | Engelson |
| 5,766,219 A | 6/1998 | Horton |
| 5,766,246 A | 6/1998 | Mulhauser et al. |
| 5,769,816 A | 6/1998 | Barbut et al. |
| 5,776,097 A | 7/1998 | Massoud |
| 5,776,162 A | 7/1998 | Kleshinski |
| 5,782,860 A | 7/1998 | Epstein et al. |
| 5,785,679 A | 7/1998 | Abolfathi et al. |
| 5,800,454 A | 9/1998 | Jacobsen et al. |
| 5,800,457 A | 9/1998 | Gelbfish |

(56) References Cited

U.S. PATENT DOCUMENTS

| | | |
|---|---|---|
| 5,800,512 A | 9/1998 | Letnz et al. |
| 5,807,261 A | 9/1998 | Benaron et al. |
| 5,810,874 A | 9/1998 | Lefebvre |
| 5,814,028 A | 9/1998 | Swartz et al. |
| 5,814,029 A | 9/1998 | Hassett |
| 5,814,064 A | 9/1998 | Daniel |
| 5,820,591 A | 10/1998 | Thompson et al. |
| 5,823,198 A | 10/1998 | Jones et al. |
| 5,830,228 A | 11/1998 | Knapp et al. |
| 5,833,673 A | 11/1998 | Ockuly et al. |
| 5,836,913 A | 11/1998 | Orth et al. |
| 5,836,968 A | 11/1998 | Simon et al. |
| 5,840,027 A | 11/1998 | Swartz et al. |
| 5,843,118 A | 12/1998 | Sepetka et al. |
| 5,846,260 A | 12/1998 | Maahs |
| 5,846,261 A | 12/1998 | Kotula et al. |
| 5,848,969 A | 12/1998 | Panescu et al. |
| 5,849,005 A | 12/1998 | Garrison et al. |
| 5,851,232 A | 12/1998 | Lois |
| 5,853,422 A | 12/1998 | Huebsch et al. |
| 5,855,597 A | 1/1999 | Jayaraman |
| 5,865,791 A | 2/1999 | Whayne et al. |
| 5,865,802 A | 2/1999 | Yoon et al. |
| 5,868,702 A | 2/1999 | Stevens et al. |
| 5,868,708 A | 2/1999 | Hart et al. |
| 5,876,367 A | 3/1999 | Kaganov et al. |
| 5,879,296 A | 3/1999 | Ockuly et al. |
| 5,879,366 A | 3/1999 | Shaw et al. |
| 5,882,340 A | 3/1999 | Yoon |
| 5,885,258 A | 3/1999 | Sachdeva et al. |
| 5,891,558 A | 4/1999 | Bell et al. |
| 5,895,399 A | 4/1999 | Barbut et al. |
| 5,902,289 A | 5/1999 | Swartz et al. |
| 5,904,680 A | 5/1999 | Kordis et al. |
| 5,904,703 A | 5/1999 | Gilson |
| 5,906,207 A | 5/1999 | Shen |
| 5,910,154 A | 6/1999 | Tsugita et al. |
| 5,911,734 A | 6/1999 | Tsugita et al. |
| 5,916,236 A | 6/1999 | Muij Van de Moer et al. |
| 5,925,060 A | 7/1999 | Forber |
| 5,925,063 A | 7/1999 | Khosravi |
| 5,925,074 A | 7/1999 | Gingras et al. |
| 5,925,075 A | 7/1999 | Myers et al. |
| 5,928,192 A | 7/1999 | Maahs |
| 5,928,260 A | 7/1999 | Chin et al. |
| 5,931,818 A | 8/1999 | Werp et al. |
| 5,935,145 A | 8/1999 | Villar et al. |
| 5,935,147 A | 8/1999 | Kensey et al. |
| 5,935,148 A | 8/1999 | Villar et al. |
| 5,941,249 A | 8/1999 | Maynard |
| 5,941,896 A | 8/1999 | Kerr |
| 5,944,738 A | 8/1999 | Amplatz et al. |
| 5,947,997 A | 9/1999 | Pavcnik et al. |
| 5,951,589 A | 9/1999 | Epstein et al. |
| 5,951,599 A | 9/1999 | McCrory |
| 5,954,694 A | 9/1999 | Sunseri |
| 5,954,767 A | 9/1999 | Pajotin et al. |
| 5,957,940 A | 9/1999 | Tanner et al. |
| 5,961,545 A | 10/1999 | Entz et al. |
| 5,976,174 A | 11/1999 | Ruiz |
| 5,980,514 A | 11/1999 | Kupiecki et al. |
| 5,980,555 A | 11/1999 | Barbut et al. |
| 5,989,281 A | 11/1999 | Barbut et al. |
| 5,993,469 A | 11/1999 | McKenzie et al. |
| 5,993,483 A | 11/1999 | Gianotti |
| 5,997,557 A | 12/1999 | Barbut et al. |
| 6,004,280 A | 12/1999 | Buck et al. |
| 6,004,348 A | 12/1999 | Banas et al. |
| 6,007,523 A | 12/1999 | Mangosong |
| 6,007,557 A | 12/1999 | Ambrisco et al. |
| 6,010,517 A | 1/2000 | Baccaro |
| 6,010,522 A | 1/2000 | Barbut et al. |
| 6,013,093 A | 1/2000 | Nott et al. |
| 6,024,751 A | 2/2000 | Lovato et al. |
| 6,024,754 A | 2/2000 | Engelson |
| 6,024,755 A | 2/2000 | Addis |
| 6,024,756 A | 2/2000 | Huebsch et al. |
| 6,027,520 A | 2/2000 | Tsugita et al. |
| 6,033,420 A | 3/2000 | Hahnen |
| 6,036,720 A | 3/2000 | Abrams et al. |
| 6,042,598 A | 3/2000 | Tsugita et al. |
| 6,048,331 A | 4/2000 | Tsugita et al. |
| 6,051,014 A | 4/2000 | Jang |
| 6,051,015 A | 4/2000 | Maahs |
| 6,056,720 A | 5/2000 | Morse |
| 6,063,070 A | 5/2000 | Eder |
| 6,063,113 A | 5/2000 | Kavteladze et al. |
| 6,066,126 A | 5/2000 | Li et al. |
| 6,068,621 A | 5/2000 | Balceta et al. |
| 6,074,357 A | 6/2000 | Kaganov et al. |
| 6,076,012 A | 6/2000 | Swanson et al. |
| 6,079,414 A | 6/2000 | Roth |
| 6,080,182 A | 6/2000 | Shaw et al. |
| 6,080,183 A | 6/2000 | Tsugita et al. |
| 6,083,239 A | 7/2000 | Addis |
| 6,090,084 A | 7/2000 | Hassett et al. |
| 6,096,052 A | 8/2000 | Callister et al. |
| 6,096,053 A | 8/2000 | Bates et al. |
| 6,110,243 A | 8/2000 | Wnenchak et al. |
| 6,123,715 A | 9/2000 | Amplatz |
| 6,124,523 A | 9/2000 | Banas et al. |
| 6,132,438 A | 10/2000 | Fleischman et al. |
| 6,135,991 A | 10/2000 | Muni et al. |
| 6,136,016 A | 10/2000 | Barbut et al. |
| 6,139,527 A | 10/2000 | Laufer et al. |
| 6,139,573 A | 10/2000 | Sogard et al. |
| 6,152,144 A | 11/2000 | Lesh et al. |
| 6,152,946 A | 11/2000 | Broome et al. |
| 6,156,055 A | 12/2000 | Ravenscroft |
| 6,159,195 A | 12/2000 | Ha et al. |
| 6,161,543 A | 12/2000 | Cox et al. |
| 6,168,615 B1 | 1/2001 | Ken et al. |
| 6,171,329 B1 | 1/2001 | Shaw et al. |
| 6,179,859 B1 | 1/2001 | Bates et al. |
| 6,193,739 B1 | 2/2001 | Chevillon et al. |
| 6,203,531 B1 | 3/2001 | Ockuly et al. |
| 6,206,907 B1 | 3/2001 | Marino et al. |
| 6,214,029 B1 | 4/2001 | Thill et al. |
| 6,221,092 B1 | 4/2001 | Koike et al. |
| 6,231,561 B1 | 5/2001 | Frazier et al. |
| 6,231,589 B1 | 5/2001 | Wessman et al. |
| 6,235,045 B1 | 5/2001 | Barbut et al. |
| 6,245,012 B1 | 6/2001 | Kleshinski |
| 6,251,122 B1 | 6/2001 | Tsukernik |
| 6,258,115 B1 | 7/2001 | Dubrul |
| 6,267,772 B1 | 7/2001 | Mulhauser et al. |
| 6,267,776 B1 | 7/2001 | O'Connell |
| 6,270,490 B1 | 8/2001 | Hahnen |
| 6,270,530 B1 | 8/2001 | Eldridge et al. |
| 6,270,902 B1 | 8/2001 | Tedeschi et al. |
| 6,277,138 B1 | 8/2001 | Levinson et al. |
| 6,285,898 B1 | 9/2001 | Ben-Haim |
| 6,290,674 B1 | 9/2001 | Roue et al. |
| 6,290,708 B1 | 9/2001 | Kugel et al. |
| 6,312,407 B1 | 11/2001 | Zadno-Azizi et al. |
| 6,319,251 B1 | 11/2001 | Tu et al. |
| 6,328,727 B1 | 12/2001 | Frazier et al. |
| 6,328,755 B1 | 12/2001 | Marshall |
| 6,342,062 B1 | 1/2002 | Suon et al. |
| 6,346,116 B1 | 2/2002 | Brooks et al. |
| 6,346,895 B1 | 2/2002 | Lee et al. |
| 6,361,545 B1 | 3/2002 | Macoviak et al. |
| 6,364,895 B1 | 4/2002 | Greenhalgh |
| 6,368,338 B1 | 4/2002 | Kónya et al. |
| 6,371,971 B1 | 4/2002 | Tsugita et al. |
| 6,375,670 B1 | 4/2002 | Greenhalgh |
| 6,391,044 B1 | 5/2002 | Yadav et al. |
| 6,398,803 B1 | 6/2002 | Layne et al. |
| 6,402,746 B1 | 6/2002 | Whayne et al. |
| 6,402,771 B1 | 6/2002 | Palmer et al. |
| 6,402,779 B1 | 6/2002 | Colone et al. |
| 6,419,669 B1 | 7/2002 | Frazier et al. |
| 6,440,152 B1 | 8/2002 | Gainor et al. |
| 6,443,972 B1 | 9/2002 | Bosma et al. |

(56) References Cited

U.S. PATENT DOCUMENTS

| | | | |
|---|---|---|---|
| 6,447,530 | B1 | 9/2002 | Ostrovsky et al. |
| 6,454,775 | B1 | 9/2002 | Demarais et al. |
| 6,458,145 | B1 | 10/2002 | Ravenscroft et al. |
| 6,464,712 | B1 | 10/2002 | Epstein et al. |
| 6,468,291 | B2 | 10/2002 | Bates et al. |
| 6,468,301 | B1 | 10/2002 | Amplatz et al. |
| 6,485,501 | B1 | 11/2002 | Green |
| 6,488,689 | B1 | 12/2002 | Kaplan et al. |
| 6,511,496 | B1 | 1/2003 | Huter et al. |
| 6,514,280 | B1 | 2/2003 | Gilson |
| 6,517,573 | B1 | 2/2003 | Pollock et al. |
| 6,533,782 | B2 | 3/2003 | Howell et al. |
| 6,547,760 | B1 | 4/2003 | Samson et al. |
| 6,547,815 | B2 | 4/2003 | Myers |
| 6,551,303 | B1 | 4/2003 | Van Tassel et al. |
| 6,551,344 | B2 | 4/2003 | Thill |
| 6,558,401 | B1 | 5/2003 | Azizi |
| 6,558,405 | B1 | 5/2003 | McInnes |
| 6,558,414 | B2 | 5/2003 | Layne |
| 6,562,058 | B2 | 5/2003 | Seguin et al. |
| 6,569,184 | B2 | 5/2003 | Huter |
| 6,569,214 | B2 | 5/2003 | Williams et al. |
| 6,589,214 | B2 | 7/2003 | McGuckin et al. |
| 6,589,251 | B2 | 7/2003 | Yee et al. |
| 6,599,308 | B2 | 7/2003 | Amplatz |
| 6,602,271 | B2 | 8/2003 | Adams et al. |
| 6,623,508 | B2 | 9/2003 | Shaw et al. |
| 6,641,564 | B1 | 11/2003 | Kraus |
| 6,650,923 | B1 | 11/2003 | Lesh et al. |
| 6,652,555 | B1 | 11/2003 | VanTassel et al. |
| 6,652,556 | B1 | 11/2003 | VanTassel et al. |
| 6,666,861 | B1 | 12/2003 | Grabek |
| 6,689,150 | B1 | 2/2004 | Vantassel et al. |
| 6,699,260 | B2 | 3/2004 | Dubrul et al. |
| 6,699,276 | B2 | 3/2004 | Sogard et al. |
| 6,702,825 | B2 | 3/2004 | Frazier et al. |
| 6,712,836 | B1 | 3/2004 | Berg et al. |
| 6,726,701 | B2 | 4/2004 | Gilson et al. |
| 6,730,108 | B2 | 5/2004 | Van Tassel et al. |
| 6,755,812 | B2 | 6/2004 | Peterson et al. |
| 6,827,737 | B2 | 12/2004 | Hill et al. |
| 6,837,901 | B2 | 1/2005 | Rabkin et al. |
| 6,855,153 | B2 | 2/2005 | Saadat |
| 6,911,037 | B2 | 6/2005 | Gainor et al. |
| 6,932,838 | B2 | 8/2005 | Schwartz et al. |
| 6,942,653 | B2 | 9/2005 | Quinn |
| 6,949,113 | B2 | 9/2005 | Van Tassel et al. |
| 6,958,061 | B2 | 10/2005 | Truckai et al. |
| 6,994,092 | B2 | 2/2006 | van der Burg et al. |
| 7,011,671 | B2 | 3/2006 | Welch |
| 7,014,645 | B2 | 3/2006 | Greene, Jr. et al. |
| 7,037,321 | B2 | 5/2006 | Sachdeva et al. |
| 7,044,134 | B2 | 5/2006 | Khairkhahan et al. |
| 7,097,651 | B2 | 8/2006 | Harrison et al. |
| 7,128,073 | B1 | 10/2006 | van der Burg et al. |
| 7,137,953 | B2 | 11/2006 | Eigler et al. |
| 7,152,605 | B2 | 12/2006 | Khairkhahan et al. |
| 7,169,164 | B2 | 1/2007 | Borillo et al. |
| 7,179,275 | B2 | 2/2007 | McGuckin, Jr. et al. |
| 7,226,466 | B2 | 6/2007 | Opolski |
| 7,303,526 | B2 | 12/2007 | Sharkey et al. |
| 7,317,951 | B2 | 1/2008 | Schneider et al. |
| 7,323,002 | B2 | 1/2008 | Johnson et al. |
| 7,597,704 | B2 | 10/2009 | Frazier et al. |
| 7,678,123 | B2 | 3/2010 | Chanduszko |
| 7,695,425 | B2 | 4/2010 | Schweich et al. |
| 7,713,282 | B2 | 5/2010 | Frazier et al. |
| 7,722,641 | B2 | 5/2010 | van der Burg et al. |
| 7,727,189 | B2 | 6/2010 | VanTassel et al. |
| 7,735,493 | B2 | 6/2010 | van der Burg et al. |
| 7,780,694 | B2 | 8/2010 | Palmer et al. |
| 7,799,049 | B2 | 9/2010 | Ostrovsky et al. |
| 7,811,300 | B2 | 10/2010 | Feller, III et al. |
| 7,811,314 | B2 | 10/2010 | Fierens et al. |
| 7,862,500 | B2 | 1/2011 | Khairkhahan et al. |
| 7,927,365 | B2 | 4/2011 | Fierens et al. |
| 7,972,359 | B2 | 7/2011 | Kreidler |
| 8,025,495 | B2 | 9/2011 | Hardert et al. |
| 8,043,329 | B2 | 10/2011 | Khairkhahan et al. |
| 8,052,715 | B2 | 11/2011 | Quinn et al. |
| 8,062,282 | B2 | 11/2011 | Kolb |
| 8,080,032 | B2 | 12/2011 | van der Burg et al. |
| 8,097,015 | B2 | 1/2012 | Devellian |
| 8,100,938 | B2 | 1/2012 | Figulla et al. |
| 8,221,384 | B2 | 7/2012 | Frazier et al. |
| 8,221,445 | B2 | 7/2012 | van Tassel et al. |
| 8,287,563 | B2 | 10/2012 | Khairkhahan et al. |
| 8,323,309 | B2 | 12/2012 | Khairkhahan et al. |
| 8,388,672 | B2 | 3/2013 | Khairkhahan et al. |
| 8,491,623 | B2 | 7/2013 | Vogel et al. |
| 8,523,897 | B2 | 9/2013 | van der Burg et al. |
| 8,535,343 | B2 | 9/2013 | van der Burg et al. |
| 8,562,509 | B2 | 10/2013 | Bates |
| 8,663,273 | B2 | 3/2014 | Khairkhahan et al. |
| 8,685,055 | B2 | 4/2014 | VanTassel et al. |
| 8,728,117 | B2 | 5/2014 | Janardhan et al. |
| 8,758,389 | B2 | 6/2014 | Glimsdale |
| 8,828,051 | B2 | 9/2014 | Javois et al. |
| 8,834,519 | B2 | 9/2014 | van der Burg et al. |
| 8,845,711 | B2 | 9/2014 | Miles et al. |
| 9,034,006 | B2 | 5/2015 | Quinn et al. |
| 9,132,000 | B2 | 9/2015 | VanTassel et al. |
| 9,168,043 | B2 | 10/2015 | van der Burg et al. |
| 9,211,124 | B2 | 12/2015 | Campbell et al. |
| 9,295,472 | B2 | 3/2016 | Ottma |
| 9,351,716 | B2 | 5/2016 | Miles et al. |
| 9,445,895 | B2 | 9/2016 | Kreidler |
| 9,554,804 | B2 | 1/2017 | Erzbeger |
| 9,554,806 | B2 | 1/2017 | Larsen et al. |
| 9,561,037 | B2 | 2/2017 | Fogarty et al. |
| 9,561,097 | B1 | 2/2017 | Kim et al. |
| 9,592,058 | B2 | 3/2017 | Erzbeger et al. |
| 9,597,088 | B2 | 3/2017 | Ottma |
| 9,629,636 | B2 | 4/2017 | Fogarty et al. |
| 9,730,701 | B2 | 8/2017 | Tischler et al. |
| 9,743,932 | B2 | 8/2017 | Amplatz et al. |
| 9,750,505 | B2 | 9/2017 | Miles et al. |
| 9,763,666 | B2 | 9/2017 | Wu et al. |
| 9,795,387 | B2 | 10/2017 | Miles et al. |
| 9,808,253 | B2 | 11/2017 | Li et al. |
| 9,883,936 | B2 | 2/2018 | Sutton et al. |
| 9,913,652 | B2 | 3/2018 | Bridgeman et al. |
| 9,943,299 | B2 | 4/2018 | Khairkhahan et al. |
| 9,943,315 | B2 | 4/2018 | Kaplan et al. |
| 10,071,181 | B1 | 9/2018 | Penegor et al. |
| 10,076,335 | B2 | 9/2018 | Zaver et al. |
| 10,143,458 | B2 | 12/2018 | Kreidler |
| 10,201,337 | B2 | 2/2019 | Glimsdale |
| 10,231,737 | B2 | 3/2019 | Amplatz et al. |
| 2001/0000797 | A1 | 5/2001 | Mazzocchi |
| 2001/0020181 | A1 | 9/2001 | Ayne |
| 2001/0034537 | A1 | 10/2001 | Shaw et al. |
| 2001/0037141 | A1 | 11/2001 | Yee et al. |
| 2002/0022860 | A1 | 2/2002 | Borillo et al. |
| 2002/0035374 | A1 | 3/2002 | Borillo et al. |
| 2002/0045931 | A1 | 4/2002 | Sogard et al. |
| 2002/0062133 | A1 | 5/2002 | Gilson et al. |
| 2002/0077555 | A1 | 6/2002 | Schwartz |
| 2002/0082638 | A1 | 6/2002 | Porter et al. |
| 2002/0082675 | A1 | 6/2002 | Myers |
| 2002/0099439 | A1 | 7/2002 | Schwartz et al. |
| 2002/0111647 | A1 | 8/2002 | Khairkhahan et al. |
| 2002/0138094 | A1 | 9/2002 | Borillo et al. |
| 2002/0138097 | A1 | 9/2002 | Ostrovsky et al. |
| 2002/0169475 | A1 | 11/2002 | Gainor et al. |
| 2002/0177855 | A1 | 11/2002 | Greene, Jr. et al. |
| 2003/0017775 | A1 | 1/2003 | Dong et al. |
| 2003/0023262 | A1 | 1/2003 | Welch |
| 2003/0023266 | A1 | 1/2003 | Borillo et al. |
| 2003/0057156 | A1 | 3/2003 | Peterson et al. |
| 2003/0060871 | A1 | 3/2003 | Hill et al. |
| 2003/0120337 | A1 | 6/2003 | Van Tassel et al. |
| 2003/0181942 | A1 | 9/2003 | Sutton et al. |
| 2003/0191526 | A1 | 10/2003 | Van Tassel et al. |

(56) References Cited

U.S. PATENT DOCUMENTS

| | | |
|---|---|---|
| 2003/0195555 A1 | 10/2003 | Khairkhahan et al. |
| 2003/0199923 A1 | 10/2003 | Khairkhahan et al. |
| 2003/0204203 A1 | 10/2003 | Khairkhahan et al. |
| 2003/0208214 A1 | 11/2003 | Loshakove et al. |
| 2003/0212432 A1 | 11/2003 | Khairkhahan et al. |
| 2003/0220667 A1 | 11/2003 | van der Burg et al. |
| 2004/0034366 A1 | 2/2004 | van der Burg et al. |
| 2004/0044361 A1 | 3/2004 | Frazier et al. |
| 2004/0049210 A1 | 3/2004 | VanTassel et al. |
| 2004/0093012 A1 | 5/2004 | Cully et al. |
| 2004/0098031 A1 | 5/2004 | van der Burg et al. |
| 2004/0122467 A1 | 6/2004 | VanTassel et al. |
| 2004/0127935 A1 | 7/2004 | VanTassel et al. |
| 2004/0158274 A1 | 8/2004 | WasDyke |
| 2004/0186486 A1 | 9/2004 | Roue et al. |
| 2004/0215230 A1 | 10/2004 | Frazier et al. |
| 2004/0220610 A1 | 11/2004 | Kreidler et al. |
| 2004/0220682 A1 | 11/2004 | Levine et al. |
| 2004/0230222 A1 | 11/2004 | van der Burg et al. |
| 2005/0004641 A1 | 1/2005 | Pappu |
| 2005/0004652 A1 | 1/2005 | van der Burg et al. |
| 2005/0015109 A1 | 1/2005 | Lichtenstein |
| 2005/0038470 A1 | 2/2005 | van der Burg et al. |
| 2005/0049573 A1 | 3/2005 | Van Tassel et al. |
| 2005/0065589 A1 | 3/2005 | Schneider et al. |
| 2005/0070952 A1 | 3/2005 | Devellian |
| 2005/0113861 A1 | 5/2005 | Corcoran et al. |
| 2005/0125020 A1 | 6/2005 | Meade et al. |
| 2005/0177182 A1 | 8/2005 | van der Burg et al. |
| 2005/0203568 A1 | 9/2005 | Burg et al. |
| 2005/0283186 A1 | 12/2005 | Berrada et al. |
| 2005/0288704 A1 | 12/2005 | Cartier et al. |
| 2006/0015136 A1 | 1/2006 | Besselink |
| 2006/0030877 A1 | 2/2006 | Martinez et al. |
| 2006/0052816 A1 | 3/2006 | Bates et al. |
| 2006/0100658 A1 | 5/2006 | Obana et al. |
| 2006/0155323 A1 | 7/2006 | Porter et al. |
| 2006/0247680 A1 | 11/2006 | Amplatz et al. |
| 2007/0066993 A1 | 3/2007 | Kreidler |
| 2007/0083227 A1 | 4/2007 | van der Burg et al. |
| 2007/0083230 A1 | 4/2007 | Javois |
| 2007/0112380 A1 | 5/2007 | Figulla et al. |
| 2007/0150041 A1 | 6/2007 | Evans et al. |
| 2007/0156123 A1 | 7/2007 | Moll et al. |
| 2007/0162048 A1 | 7/2007 | Quinn et al. |
| 2007/0185471 A1 | 8/2007 | Johnson |
| 2008/0275536 A1 | 11/2008 | Zarins et al. |
| 2009/0005803 A1 | 1/2009 | Batiste |
| 2009/0062841 A1 | 3/2009 | Amplatz et al. |
| 2009/0099647 A1 | 4/2009 | Glimsdale et al. |
| 2009/0105557 A1* | 4/2009 | Najafi ............... A61B 5/0537 600/301 |
| 2009/0105747 A1 | 4/2009 | Chanduszko et al. |
| 2009/0112249 A1 | 4/2009 | Miles et al. |
| 2009/0254195 A1 | 10/2009 | Khairkhan et al. |
| 2009/0318948 A1 | 12/2009 | Linder et al. |
| 2010/0004726 A1 | 1/2010 | Hancock et al. |
| 2010/0049238 A1 | 2/2010 | Simpson |
| 2010/0106178 A1 | 4/2010 | Obermiller et al. |
| 2010/0324585 A1 | 12/2010 | Miles et al. |
| 2011/0054515 A1 | 3/2011 | Bridgeman et al. |
| 2011/0082495 A1 | 4/2011 | Ruiz |
| 2011/0098525 A1 | 4/2011 | Kermode et al. |
| 2011/0218566 A1 | 9/2011 | van der Burg et al. |
| 2011/0301630 A1 | 12/2011 | Hendriksen et al. |
| 2012/0022507 A1* | 1/2012 | Najafi ............... A61B 5/6869 606/1 |
| 2012/0029553 A1 | 2/2012 | Quinn et al. |
| 2012/0035643 A1 | 2/2012 | Khairkhahan et al. |
| 2012/0065662 A1 | 3/2012 | van der Burg et al. |
| 2012/0125619 A1 | 5/2012 | Wood et al. |
| 2012/0172654 A1 | 7/2012 | Bates |
| 2012/0172927 A1 | 7/2012 | Campbell et al. |
| 2012/0239077 A1 | 9/2012 | Zaver et al. |
| 2012/0239083 A1 | 9/2012 | Kreidler |
| 2012/0245619 A1 | 9/2012 | Guest |
| 2012/0271337 A1 | 10/2012 | Figulla et al. |
| 2012/0283585 A1 | 11/2012 | Werneth et al. |
| 2012/0283773 A1 | 11/2012 | Van Tassel et al. |
| 2012/0323267 A1 | 12/2012 | Ren |
| 2013/0006343 A1 | 1/2013 | Kassab et al. |
| 2013/0012982 A1 | 1/2013 | Khairkhahan et al. |
| 2013/0018413 A1 | 1/2013 | Oral et al. |
| 2013/0110154 A1 | 5/2013 | van der Burg et al. |
| 2013/0131717 A1 | 5/2013 | Glimsdale |
| 2013/0165735 A1 | 6/2013 | Khairkhahan et al. |
| 2013/0165965 A1 | 6/2013 | Carlson et al. |
| 2013/0211492 A1 | 8/2013 | Schneider et al. |
| 2013/0296912 A1 | 11/2013 | Ottma |
| 2013/0331884 A1 | 12/2013 | Van der Burg et al. |
| 2013/0338686 A1 | 12/2013 | Ruiz |
| 2014/0005714 A1 | 1/2014 | Quick et al. |
| 2014/0018841 A1 | 1/2014 | Peiffer et al. |
| 2014/0039536 A1 | 2/2014 | Cully et al. |
| 2014/0046360 A1 | 2/2014 | van der Burg et al. |
| 2014/0081314 A1 | 3/2014 | Zaver et al. |
| 2014/0100596 A1 | 4/2014 | Rudman et al. |
| 2014/0142612 A1 | 5/2014 | Li et al. |
| 2014/0148842 A1 | 5/2014 | Khairkhahan et al. |
| 2014/0163605 A1 | 6/2014 | VanTassel et al. |
| 2014/0188157 A1 | 7/2014 | Clark |
| 2014/0214077 A1 | 7/2014 | Glimsdale |
| 2014/0296908 A1 | 10/2014 | Ottma et al. |
| 2014/0303719 A1 | 10/2014 | Cox et al. |
| 2014/0336612 A1 | 11/2014 | Frydlewski et al. |
| 2014/0336699 A1 | 11/2014 | van der Burg et al. |
| 2014/0364941 A1 | 12/2014 | Edmiston et al. |
| 2015/0005810 A1 | 1/2015 | Center et al. |
| 2015/0039021 A1 | 2/2015 | Khairkhahan et al. |
| 2015/0080903 A1 | 3/2015 | Dillard et al. |
| 2015/0196300 A1 | 7/2015 | Tischler et al. |
| 2015/0230909 A1 | 8/2015 | Zaver et al. |
| 2015/0238197 A1 | 8/2015 | Quinn et al. |
| 2015/0305727 A1 | 10/2015 | Karimov et al. |
| 2015/0313604 A1 | 11/2015 | Roue et al. |
| 2015/0313605 A1 | 11/2015 | Griffin |
| 2015/0327979 A1 | 11/2015 | Quinn et al. |
| 2015/0374491 A1 | 12/2015 | Kreidler |
| 2016/0015397 A1 | 1/2016 | Figulla et al. |
| 2016/0051358 A1 | 2/2016 | Sutton et al. |
| 2016/0058539 A1 | 3/2016 | VanTassel et al. |
| 2016/0066922 A1 | 3/2016 | Bridgeman et al. |
| 2016/0106437 A1 | 4/2016 | van der Burg et al. |
| 2016/0192942 A1 | 7/2016 | Strauss et al. |
| 2016/0287259 A1 | 10/2016 | Hanson et al. |
| 2016/0331382 A1 | 11/2016 | Center et al. |
| 2016/0374657 A1 | 12/2016 | Kreidler |
| 2017/0007262 A1 | 1/2017 | Amplatz et al. |
| 2017/0027552 A1 | 2/2017 | Turkington et al. |
| 2017/0042550 A1 | 2/2017 | Chakraborty et al. |
| 2017/0056166 A1 | 3/2017 | Ratz et al. |
| 2017/0100112 A1 | 4/2017 | van der Burg et al. |
| 2017/0119400 A1 | 5/2017 | Amplatz et al. |
| 2017/0181751 A1 | 6/2017 | Larsen et al. |
| 2017/0340336 A1 | 11/2017 | Osypka |
| 2017/0354421 A1 | 12/2017 | Maguire et al. |
| 2018/0064446 A1 | 3/2018 | Figulla et al. |
| 2018/0070950 A1 | 3/2018 | Zaver et al. |
| 2018/0110468 A1 | 4/2018 | Goldshtein et al. |
| 2018/0140412 A1 | 5/2018 | Sutton et al. |
| 2018/0140413 A1 | 5/2018 | Quinn et al. |
| 2018/0250014 A1 | 9/2018 | Melanson et al. |
| 2018/0369594 A1 | 12/2018 | Werneth et al. |
| 2019/0133563 A1 | 5/2019 | Glimsdale |
| 2019/0175185 A1 | 6/2019 | Amplatz et al. |
| 2019/0223883 A1 | 7/2019 | Anderson et al. |
| 2019/0247053 A1 | 8/2019 | Inouye |
| 2019/0336135 A1* | 11/2019 | Inouye ............... A61B 5/02042 |
| 2020/0205738 A1* | 7/2020 | Adawi ............... A61B 5/028 |
| 2020/0205840 A1 | 7/2020 | Adawi et al. |
| 2021/0361238 A1* | 11/2021 | Bak-Boychuk ...... A61B 5/6869 |
| 2021/0369283 A1* | 12/2021 | O'Halloran ...... A61B 17/12122 |

(56) References Cited

U.S. PATENT DOCUMENTS

FOREIGN PATENT DOCUMENTS

| | | |
|---|---|---|
| CN | 104287804 A | 1/2015 |
| CN | 104352261 A | 2/2015 |
| CN | 106859722 A | 6/2017 |
| CN | 10964173 A | 3/2019 |
| DE | 10201004476 A1 | 3/2012 |
| EP | 1523957 A2 | 4/2005 |
| EP | 1595504 A1 | 11/2005 |
| EP | 2074953 A1 | 1/2009 |
| EP | 2481381 A1 | 8/2012 |
| EP | 2928420 A1 | 10/2015 |
| EP | 3072461 A1 | 9/2016 |
| EP | 3372173 A2 | 9/2018 |
| EP | 3398523 A1 | 11/2018 |
| JP | 2003532457 A | 11/2003 |
| JP | 2005324019 A | 11/2005 |
| JP | 2007513684 A | 5/2007 |
| JP | 2009160402 A | 7/2009 |
| JP | 2012501793 A | 1/2012 |
| WO | 9313712 A1 | 7/1993 |
| WO | 9504132 A1 | 2/1995 |
| WO | 9522359 A1 | 8/1995 |
| WO | 9601591 A1 | 1/1996 |
| WO | 9640356 A1 | 12/1996 |
| WO | 9721402 A1 | 6/1997 |
| WO | 9726939 A1 | 7/1997 |
| WO | 9728749 A1 | 8/1997 |
| WO | 9735522 A1 | 10/1997 |
| WO | 9802100 A1 | 1/1998 |
| WO | 9817187 A1 | 4/1998 |
| WO | 9822026 A1 | 5/1998 |
| WO | 9823322 A1 | 6/1998 |
| WO | 9827868 A1 | 7/1998 |
| WO | 9905977 A1 | 2/1999 |
| WO | 9907289 A1 | 2/1999 |
| WO | 9908607 A1 | 2/1999 |
| WO | 9923976 A1 | 5/1999 |
| WO | 9925252 A1 | 5/1999 |
| WO | 9930640 A1 | 6/1999 |
| WO | 9944510 A1 | 9/1999 |
| WO | 9959479 A1 | 11/1999 |
| WO | 0001308 A1 | 1/2000 |
| WO | 0016705 A1 | 3/2000 |
| WO | 0027292 A1 | 5/2000 |
| WO | 0035352 A1 | 6/2000 |
| WO | 0053120 A1 | 9/2000 |
| WO | 0067669 A1 | 11/2000 |
| WO | 0108743 A1 | 2/2001 |
| WO | 0115629 A1 | 3/2001 |
| WO | 0121247 A1 | 3/2001 |
| WO | 0126726 A1 | 4/2001 |
| WO | 0130266 A1 | 5/2001 |
| WO | 0130267 A1 | 5/2001 |
| WO | 0130268 A1 | 5/2001 |
| WO | 0170119 A1 | 9/2001 |
| WO | 0215793 A2 | 2/2002 |
| WO | 0224106 A2 | 3/2002 |
| WO | 02071977 A2 | 9/2002 |
| WO | 03007825 A1 | 1/2003 |
| WO | 03008030 A2 | 1/2003 |
| WO | 03032818 A1 | 4/2003 |
| WO | 2004012629 A1 | 2/2004 |
| WO | 2007044536 A1 | 4/2007 |
| WO | 2010024801 A1 | 3/2010 |
| WO | 2010081033 A1 | 7/2010 |
| WO | 2013060855 A1 | 5/2013 |
| WO | 2013159065 A1 | 10/2013 |
| WO | 2014011865 A1 | 1/2014 |
| WO | 2014018907 A1 | 1/2014 |
| WO | 2014089129 A1 | 6/2014 |
| WO | 201406239 A1 | 7/2014 |
| WO | 2015164836 A1 | 10/2015 |
| WO | 2016087145 A1 | 6/2016 |
| WO | 2018017935 A1 | 1/2018 |
| WO | 2018187732 A1 | 10/2018 |
| WO | 2019084358 A1 | 5/2019 |

OTHER PUBLICATIONS

International Search Report and Written Opinion dated Jul. 15, 2021 for International Application No. PCT/US2021/023687.

International Search Report and Written Opinion dated Apr. 19, 2022 for International Application No. PCT/US2022/012322.

International Search Report and Written Opinion dated Aug. 3, 2004 for International Application No. PCT/US2004/008109.

International Search Report and Written Opinion dated Feb. 15, 2000 for International Application No. PCT/US99/26325.

International Search Report dated May 20, 2003 for International Application No. PCT/US02/33808.

Written Opinion dated Nov. 17, 2003 for International Application No. PCT/US/02/33808.

International Search Report and Written Opinion dated Aug. 21, 2018 for International Application No. PCT/US2018/029684.

Cragg et al., "A New Percutaneous Vena Cava Filter," American Journal of Radiology, Sep. 1983, pp. 601-604, vol. 141.

Cragg et al., "Nonsurgical Placement of Arterial Endoprostheses: A New Technique Using Nitinol Wire," Radiology, Apr. 1983, pp. 261-263, vol. 147, No. 1.

Lock et al., "Transcatheter Closure of Atrial Septal Defects." Circulation, May 1989, pp. 1091-1099, vol. 79, No. 5.

Lock et al., "Transcatheter Umbrella Closure of Congenital Heart Defects," Circulation, Mar. 1987, pp. 593-599, vol. 75, No. 3.

Rashkind et al., "Nonsurgical closure of patent ductus arteriosus: clinical application of the Rashkind PDA Occluder System," Circulation, Mar. 1987, pp. 583-592, vol. 75, No. 3.

Rosengart et al., "Percutaneous and Minimally Invasive Valve Procedures," Circulation, Apr. 1, 2008, pp. 1750-1767, vol. 117.

Ruttenberg, "Nonsurgical Therapy of Cardiac Disorders," Pediatric Consult, 1986, Pages not numbered, vol. 5, No. 2.

Sugita et al., "Nonsurgical Implantations of a Vascular Ring Prosthesis Using Thermal Shape Memory Ti/Ni Alloy (Nitinol Wire)," Trans. Am. Soc. Artif. Intern. Organs, 1986, pp. 30-34, vol. XXXII.

Wessel et al., "Outpatient Closure of the Patent Ductus Arteriousus," Circulation, 1988, pp. 1068-1071, vol. 77, No. 5.

Tung et al., U.S. Appl. No. 61/559,941, filed Nov. 15, 2011.

Yue Yu et al., U.S. Appl. No. 61/557,880, filed Dec. 20, 2011.

Cline, "File: Fish hooks.jpg," Wikipedia foundation , Inc., San Francisco, CA, Jun. 2007; p. 1 of 4; available online at http://en.wikipedia.org/wiki/File:Fish_hooks.jpg; last accessed Oct. 5, 2012.

International Search Report and Written Opinion dated Apr. 22, 2014 for International Application No. PCT/US2013/078454.

Aryana et al., "Incomplete Closure of the Left Atrial Appendage: Implication and Management." Curr Cardiol Rep., 18(9):82, 2016.

Delurgio, "Device-Associated Thrombus and Peri-Device Leak Following Left Atrial Appendage Closure with the Amplatzer Cardiac Plug." JACC: Cardiovascular Interventions, 10(4): 400-402, 2017.

University of Minnesota. Atlas of Human Cardiac Anatomy, Left Atrium. Retrieved from http://www.vhlab.umn.edu/atlas/left-atrium/left-atrial-appendage/index.shtml. Accessed 2017. Downloaded 2019.

Saw et al., "Incidence and Clinical Impact of Device-Associated Thrombus and Peri-Device Leak following Left Atrial Appendage Closure with the Amplatzer Cardiac Plug." JACC: Cardiovascular Intervention. 10(4): 391-399, 2017.

Romero et al., "Left Atrial Appendage Closure Devices," Clinical Medicine Insights: Cardiology, vol. 8, pp. 45-52, 2014.

Invitation to Pay Additional Fees and, Where Applicable, Protest Fee, mailed Oct. 13, 2016.

International Search Report and Written Opinion dated Oct. 14, 2019 for International Application No. PCT/US2019/047452.

International Search Report and Written Opinion dated Oct. 27, 2017 for International Application No. PCT/US2017/048150.

International Search Report and Written Opinion dated Jan. 21, 2019 for International Application No. PCT/US2018/051953.

(56) References Cited

OTHER PUBLICATIONS

International Search Report and Written Opinion dated Oct. 13, 2016 for International Application No. PCT/US2016/043363.
International Search Report and Written Opinion dated Mar. 17, 20, for International Application No. PCT/US2019/065243.
International Search Report and Written Opinion dated Sep. 9, 2019 for International Application No. PCT/US2019/033698.
Blackshear et al; "Appendage Obliteration to Reduce Stroke in Cardiac Surgical Patients with Atrial Fibrillation", Ann. Thoracic Surgery, pp. 755-759, 1996.
Lindsay, "Obliteration of the Left Atrial Appendage: A Concept Worth Testing", Ann. Thoracic Surgery, 1996.
Invitation to Pay Additional Fees dated Feb. 22, 2019 for International Application No. PCT/US2018/066163.
International Search Report and Written Opinion dated Oct. 23, 2020 for International Application No. PCT/US2020/042192.

* cited by examiner

MEDICAL SYSTEM FOR TREATING A LEFT ATRIAL APPENDAGE

CROSS-REFERENCE TO RELATED APPLICATIONS

This application claims the benefit of priority of U.S. Provisional Application No. 63/137,387 filed Jan. 14, 2021, the entire disclosure of which is hereby incorporated by reference.

TECHNICAL FIELD

The disclosure relates generally to medical devices and more particularly to medical devices that are adapted for use in percutaneous medical procedures including implantation into the left atrial appendage (LAA) of a heart.

BACKGROUND

The left atrial appendage is a small organ attached to the left atrium of the heart. During normal heart function, as the left atrium constricts and forces blood into the left ventricle, the left atrial appendage constricts and forces blood into the left atrium. The ability of the left atrial appendage to contract assists with improved filling of the left ventricle, thereby playing a role in maintaining cardiac output. However, in patients suffering from atrial fibrillation, the left atrial appendage may not properly contract or empty, causing stagnant blood to pool within its interior, which can lead to the undesirable formation of thrombi within the left atrial appendage.

Thrombi forming in the left atrial appendage may break loose from this area and enter the blood stream. Thrombi that migrate through the blood vessels may eventually plug a smaller vessel downstream and thereby contribute to stroke or heart attack. Clinical studies have shown that the majority of blood clots in patients with atrial fibrillation originate in the left atrial appendage. As a treatment, medical devices have been developed which are deployed to close off the left atrial appendage. Of the known medical devices and methods, each has certain advantages and disadvantages. There is an ongoing need to provide alternative medical devices and introducers as well as alternative methods for manufacturing and using medical devices and introducers.

SUMMARY

In one example, a medical system may comprise a left atrial appendage closure device including an expandable framework and a proximal hub disposed along a central longitudinal axis of the expandable framework, the expandable framework being configured to shift between a collapsed delivery configuration and an expanded deployed configuration; wherein the left atrial appendage closure device includes a sensor at least partially disposed within an interior of the expandable framework and axially movable relative to the proximal hub; wherein the proximal hub includes a first threaded connection structure; and a delivery catheter including a core wire extending axially within a lumen of the delivery catheter, the core wire having a second threaded connection structure at a distal end thereof configured to releasably engage the first threaded connection structure in an unreleased configuration.

In addition or alternatively to any example disclosed herein, the sensor is a pressure sensor configured to sense a fluid pressure within a space facing a proximal end of the sensor when the left atrial appendage closure device is in a released configuration.

In addition or alternatively to any example disclosed herein, when the second threaded connection structure is engaged with the first threaded connection structure, a distal end of the second threaded connection structure engages a proximal end of the sensor.

In addition or alternatively to any example disclosed herein, when the second threaded connection structure is disengaged from the first threaded connection structure, the sensor is at least partially disposed within the proximal hub.

In addition or alternatively to any example disclosed herein, when the second threaded connection structure is disengaged from the first threaded connection structure, a proximal end of the sensor extends proximal of the proximal hub.

In addition or alternatively to any example disclosed herein, the left atrial appendage closure device includes at least one spring engaged with the proximal hub and the sensor.

In addition or alternatively to any example disclosed herein, the at least one spring is one coil spring disposed coaxially about the sensor.

In addition or alternatively to any example disclosed herein, the at least one spring includes a plurality of springs spaced circumferentially around the sensor.

In addition or alternatively to any example disclosed herein, the at least one spring is fixedly attached to an inner surface of the proximal hub.

In addition or alternatively to any example disclosed herein, the sensor includes a third threaded connection structure configured to threadably couple the sensor to the first threaded connection structure.

In addition or alternatively to any example disclosed herein, when the left atrial appendage closure device is not in a released configuration, rotation of the core wire relative to the proximal hub rotates the sensor relative to the proximal hub.

In addition or alternatively to any example disclosed herein, a medical system may comprise a left atrial appendage closure device including an expandable framework and a proximal hub disposed along a central longitudinal axis of the expandable framework, the expandable framework being configured to shift between a collapsed delivery configuration and an expanded deployed configuration; wherein the left atrial appendage closure device includes a sensor at least partially disposed within an interior of the expandable framework and axially movable relative to the proximal hub; wherein the proximal hub includes a first threaded connection structure; and a delivery catheter including a core wire extending axially within a lumen of the delivery catheter, the core wire having a second threaded connection structure at a distal end thereof configured to releasably engage the first threaded connection structure in an unreleased configuration; wherein the sensor includes an annular ledge extending radially outward from an outer surface of the sensor.

In addition or alternatively to any example disclosed herein, the annular ledge is axially closer to a distal end of the proximal hub in a released configuration than in the unreleased configuration.

In addition or alternatively to any example disclosed herein, the annular ledge is configured to engage the proximal hub when the left atrial appendage closure device is in a released configuration.

In addition or alternatively to any example disclosed herein, in a released configuration, the sensor occupies at least 70% of a volume defined by the first threaded connection structure.

In addition or alternatively to any example disclosed herein, a medical system may comprise a left atrial appendage closure device including an expandable framework and a proximal hub disposed along a central longitudinal axis of the expandable framework, the expandable framework being configured to shift between a collapsed delivery configuration and an expanded deployed configuration; wherein the left atrial appendage closure device includes a sensor at least partially disposed within an interior of the expandable framework and axially movable relative to the proximal hub; wherein the proximal hub includes a first connection structure; and a delivery catheter including a core wire extending axially within a lumen of the delivery catheter, the core wire having a second connection structure at a distal end thereof configured to releasably engage the first connection structure in an unreleased configuration; wherein an occlusive element is disposed over at least a portion of the expandable framework.

In addition or alternatively to any example disclosed herein, the expandable framework includes a plurality of interconnected struts joined together at the proximal hub.

In addition or alternatively to any example disclosed herein, the first connection structure is formed on an inside surface of the proximal hub the second connection structure is formed on an outside surface of the core wire.

In addition or alternatively to any example disclosed herein, at least one spring is disposed between the proximal hub and the sensor in tension.

In addition or alternatively to any example disclosed herein, at least one spring is disposed between the proximal hub and the sensor in compression.

The above summary of some embodiments, aspects, and/or examples is not intended to describe each embodiment or every implementation of the present disclosure. The figures and the detailed description which follows more particularly exemplify these embodiments.

BRIEF DESCRIPTION OF THE DRAWINGS

The disclosure may be more completely understood in consideration of the following detailed description of various embodiments in connection with the accompanying drawings, in which.

Figure 1:
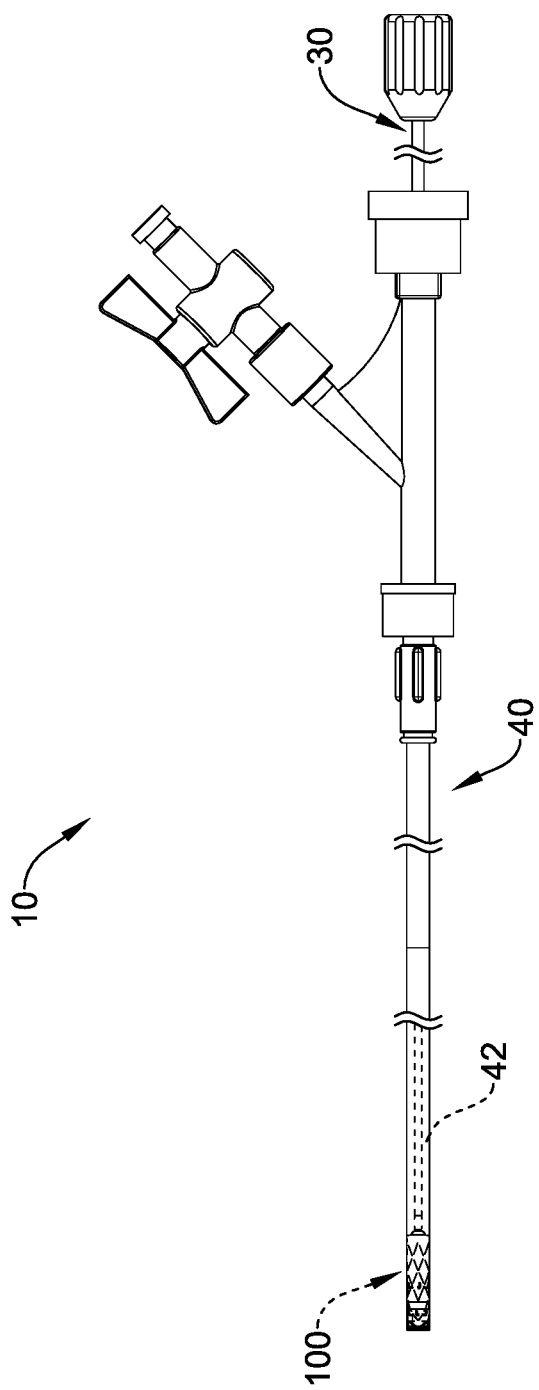
FIGS. 1-2 are side views of an example medical system.

While aspects of the disclosure are amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DETAILED DESCRIPTION

The following description should be read with reference to the drawings, which are not necessarily to scale, wherein like reference numerals indicate like elements throughout the several views. The detailed description and drawings are intended to illustrate but not limit the current disclosure. Those skilled in the art will recognize that the various elements described and/or shown may be arranged in various combinations and configurations without departing from the scope of the disclosure. The detailed description and drawings illustrate example embodiments of the current disclosure. However, in the interest of clarity and ease of understanding, while every feature and/or element may not be shown in each drawing, the feature(s) and/or element(s) may be understood to be present regardless, unless otherwise specified.

For the following defined terms, these definitions shall be applied, unless a different definition is given in the claims or elsewhere in this specification.

All numeric values are herein assumed to be modified by the term "about," whether or not explicitly indicated. The term "about", in the context of numeric values, generally refers to a range of numbers that one of skill in the art would consider equivalent to the recited value (e.g., having the same function or result). In many instances, the term "about" may include numbers that are rounded to the nearest significant figure. Other uses of the term "about" (e.g., in a context other than numeric values) may be assumed to have their ordinary and customary definition(s), as understood from and consistent with the context of the specification, unless otherwise specified.

The recitation of numerical ranges by endpoints includes all numbers within that range, including the endpoints (e.g., 1 to 5 includes 1, 1.5, 2, 2.75, 3, 3.80, 4, and 5).

Although some suitable dimensions, ranges, and/or values pertaining to various components, features and/or specifications are disclosed, one of skill in the art, incited by the present disclosure, would understand desired dimensions, ranges, and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise. It is to be noted that in order to facilitate understanding, certain features of the disclosure may be described in the singular, even though those features may be plural or recurring within the disclosed example(s). Each instance of the features may include and/or be encompassed by the singular disclosure(s), unless expressly stated to the contrary. For simplicity and clarity purposes, not all elements of the current disclosure are necessarily shown in each figure or discussed in detail below. However, it will be understood that the following discussion may apply equally to any and/or all of the components for which there are more than one, unless explicitly stated to the contrary. Additionally, not all instances of some elements or features may be shown in each figure for clarity.

Relative terms such as "proximal", "distal", "advance", "retract", variants thereof, and the like, may be generally considered with respect to the positioning, direction, and/or operation of various elements relative to a user/operator/manipulator of the device, wherein "proximal" and "retract" indicate or refer to closer to or toward the user and "distal" and "advance" indicate or refer to farther from or away from the user. In some instances, the terms "proximal" and "distal" may be arbitrarily assigned in an effort to facilitate understanding of the disclosure, and such instances will be readily apparent to the skilled artisan. Other relative terms, such as "upstream", "downstream", "inflow", and "outflow" refer to a direction of fluid flow within a lumen, such as a body lumen, a blood vessel, or within a device. Still other relative terms, such as "axial", "circumferential", "longitudinal", "lateral", "radial", etc. and/or variants thereof generally refer to direction and/or orientation relative to a central longitudinal axis of the disclosed structure or device.

The term "extent" may be understood to mean a greatest measurement of a stated or identified dimension, unless the extent or dimension in question is preceded by or identified as a "minimum", which may be understood to mean a smallest measurement of the stated or identified dimension. For example, "outer extent" may be understood to mean an outer dimension, "radial extent" may be understood to mean a radial dimension, "longitudinal extent" may be understood to mean a longitudinal dimension, etc. Each instance of an "extent" may be different (e.g., axial, longitudinal, lateral, radial, circumferential, etc.) and will be apparent to the skilled person from the context of the individual usage. Generally, an "extent" may be considered a greatest possible dimension measured according to the intended usage, while a "minimum extent" may be considered a smallest possible dimension measured according to the intended usage. In some instances, an "extent" may generally be measured orthogonally within a plane and/or cross-section, but may be, as will be apparent from the particular context, measured differently—such as, but not limited to, angularly, radially, circumferentially (e.g., along an arc), etc.

The terms "monolithic" and "unitary" shall generally refer to an element or elements made from or consisting of a single structure or base unit/element. A monolithic and/or unitary element shall exclude structure and/or features made by assembling or otherwise joining multiple discrete structures or elements together.

It is noted that references in the specification to "an embodiment", "some embodiments", "other embodiments", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to implement the particular feature, structure, or characteristic in connection with other embodiments, whether or not explicitly described, unless clearly stated to the contrary. That is, the various individual elements described below, even if not explicitly shown in a particular combination, are nevertheless contemplated as being combinable or arrangeable with each other to form other additional embodiments or to complement and/or enrich the described embodiment(s), as would be understood by one of ordinary skill in the art.

For the purpose of clarity, certain identifying numerical nomenclature (e.g., first, second, third, fourth, etc.) may be used throughout the description and/or claims to name and/or differentiate between various described and/or claimed features. It is to be understood that the numerical nomenclature is not intended to be limiting and is exemplary only. In some embodiments, alterations of and deviations from previously used numerical nomenclature may be made in the interest of brevity and clarity. That is, a feature identified as a "first" element may later be referred to as a "second" element, a "third" element, etc. or may be omitted entirely, and/or a different feature may be referred to as the "first" element. The meaning and/or designation in each instance will be apparent to the skilled practitioner.

The following figures illustrate selected components and/or arrangements of an implant for occluding the left atrial appendage, a medical system for occluding the left atrial appendage, and/or methods of using the implant and/or the medical system. It should be noted that in any given figure, some features may not be shown, or may be shown schematically, for simplicity. Additional details regarding some of the components of the implant and/or the system may be illustrated in other figures in greater detail. While discussed in the context of occluding the left atrial appendage, the implant and/or the system may also be used for other interventions and/or percutaneous medical procedures within a patient. Similarly, the devices and methods described herein with respect to percutaneous deployment may be used in other types of surgical procedures, as appropriate. For example, in some examples, the devices may be used in a non-percutaneous procedure. Devices and methods in accordance with the disclosure may also be adapted and configured for other uses within the anatomy.

Figure 2:
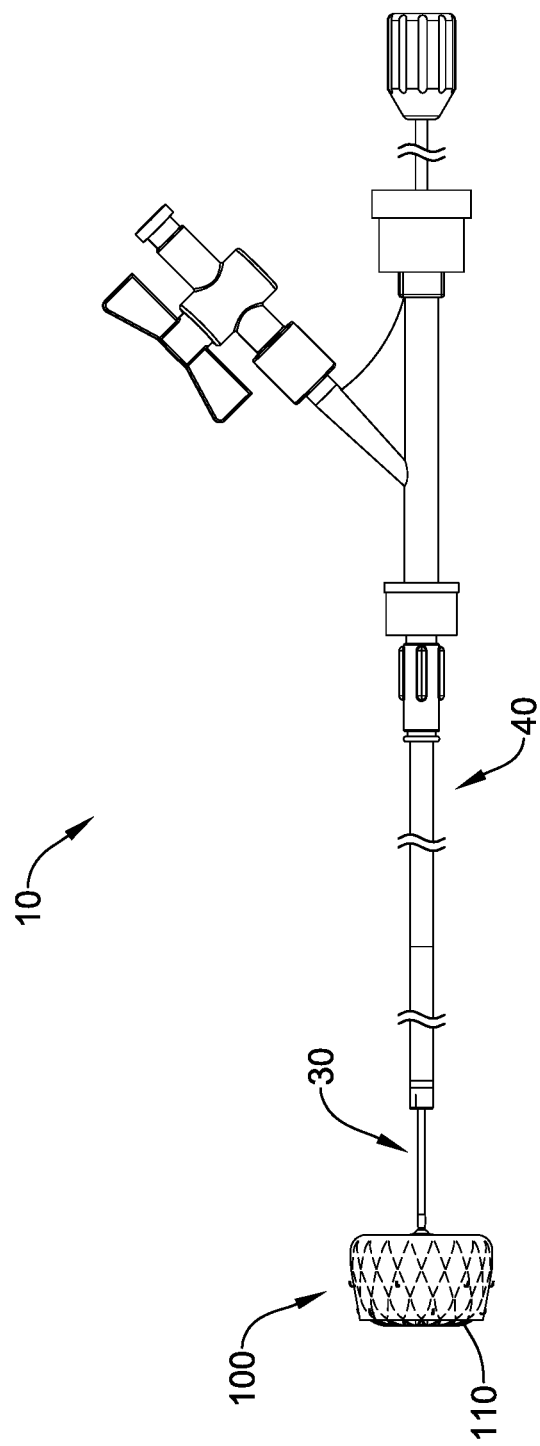

Turning now to the figures, FIGS. 1-2 illustrate a medical system 10 including an delivery catheter 40 having a lumen 42 extending from a proximal opening to a distal opening, a core wire 30 slidably disposed and/or extending axially within the lumen 42 of the delivery catheter 40, and a left atrial appendage closure device 100 having an expandable framework 110 configured to shift between a collapsed delivery configuration (e.g., FIG. 1), wherein the left atrial appendage closure device 100 is disposed within the lumen 42 proximate the distal opening in the collapsed delivery configuration, and an expanded deployed configuration (e.g., FIG. 2). The left atrial appendage closure device 100 and/or the expandable framework 110 may be configured to shift between the collapsed delivery configuration and the expanded deployed configuration when the left atrial appendage closure device 100 is disposed distal of the distal opening of the lumen 42 and/or the delivery catheter 40, and/or when the left atrial appendage closure device 100 is unconstrained by the delivery catheter 40. The left atrial appendage closure device 100 may be disposed at and/or releasably connected to a distal portion of the core wire 30. The core wire 30 may be slidably and/or rotatably disposed within the lumen 42 of the delivery catheter 40. In some embodiments, a proximal end of the core wire 30 may extend proximally of a proximal end of the delivery catheter 40 and/or the proximal opening of the lumen 42 for manual manipulation by a clinician or practitioner. In some embodiments, the example left atrial appendage closure device 100 may be releasably engaged with, removably attached to, or otherwise releasably connected to the distal end of the core wire 30. Some suitable, but non-limiting, examples of materials for the medical system 10, the core wire 30, the delivery catheter 40, and/or the left atrial appendage closure device 100, etc. are discussed below. It is contemplated that any and/or all example occlusive implants disclosed herein may be used in accordance with and/or be associated with the example medical system 10 described above.

Figure 3:
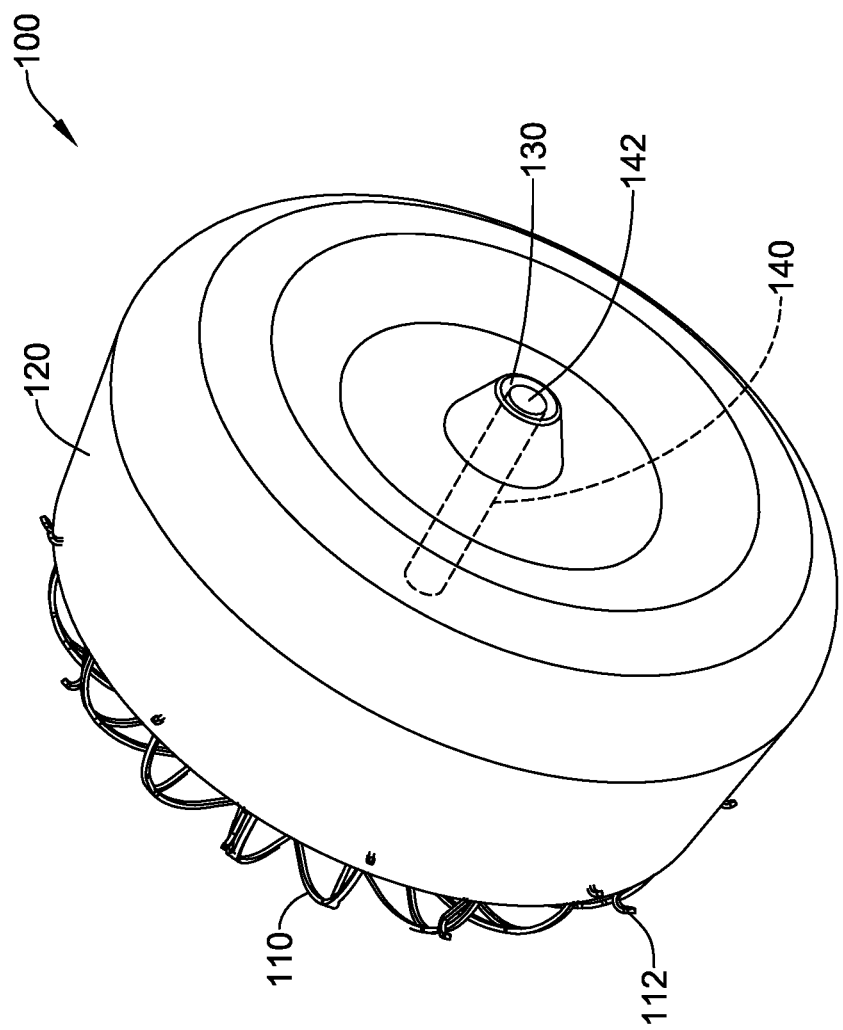
FIGS. 3-4 illustrate aspects of a left atrial appendage closure device.
Figure 4:
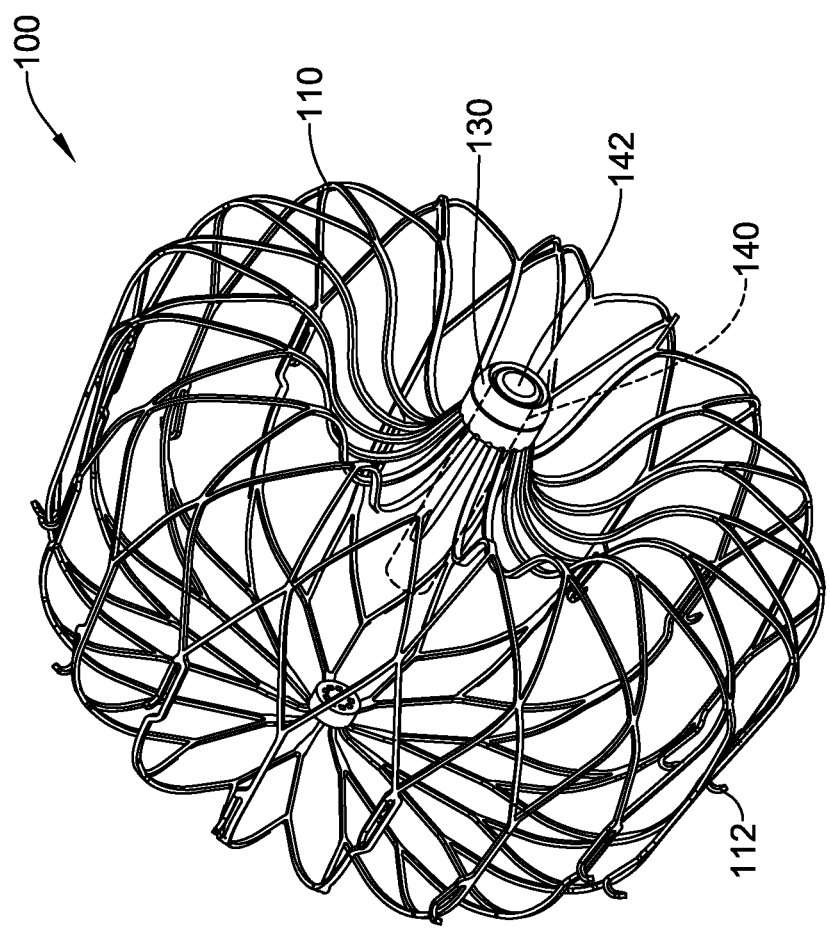

FIGS. 3-4 illustrate an example configuration of the left atrial appendage closure device 100 comprising the expandable framework 110 configured to shift between the collapsed delivery configuration and the expanded deployed configuration. In some embodiments, the left atrial appendage closure device 100 may include a proximal hub 130 disposed along a central longitudinal axis of the expandable framework 110. In some embodiments, the proximal hub 130 may be centered on the central longitudinal axis of the expandable framework 110. For example, the proximal hub 130 may be coaxial with the central longitudinal axis of the expandable framework 110. In some embodiments, the expandable framework 110 may include a plurality of interconnected struts joined together at the proximal hub 130. In some embodiments, the proximal hub 130 may be integrally formed with and/or may be monolithically formed with the expandable framework 110 and/or the plurality of interconnected struts. In some embodiments, the left atrial appendage closure device 100 may include, and/or the expandable framework 110 may be, a self-expanding framework.

The expandable framework 110 may be compliant and substantially conform to and/or be in sealing engagement with the shape and/or geometry of a lateral wall and/or an ostium of a left atrial appendage in the expanded deployed configuration. In some embodiments, the left atrial appendage closure device 100 may expand to a size, extent, or shape less than or different from a maximum unconstrained extent, as determined by the surrounding tissue and/or lateral wall of the left atrial appendage. In some embodiments, reducing a thickness of various elements of the expandable framework 110 may increase the flexibility and compliance of the expandable framework 110 and/or the left atrial appendage closure device 100, thereby permitting the expandable framework 110 and/or the left atrial appendage closure device 100 to conform to the tissue around it, rather than forcing the tissue to conform to the expandable framework 110 and/or the left atrial appendage closure device 100.

In some embodiments, the left atrial appendage closure device 100 may optionally include an occlusive element 120 (e.g., a mesh, a fabric, a membrane, and/or other surface treatment) disposed on, disposed over, disposed about, or covering at least a portion of the expandable framework 110, as seen in FIG. 3. In some embodiments, the occlusive element 120 may be disposed on, disposed over, disposed about or cover at least a portion of an outer (or outwardly facing) surface of the expandable framework 110. In some embodiments, the occlusive element 120 may be secured to and/or may extend radially outward from the proximal hub 130. For reference, the occlusive element 120 has been removed from FIG. 4 to show selected aspects of the left atrial appendage closure device 100 otherwise hidden from view by the occlusive element 120.

In some embodiments, the expandable framework 110 may include a plurality of anchor members 112 disposed about a periphery of the expandable framework 110 in the expanded deployed configuration. The plurality of anchor members 112 may extend radially outward from the expandable framework 110. In some embodiments, at least some of the plurality of anchor members 112 may each have and/or include a body portion, a tip portion, and a barb projecting circumferentially therefrom. In some embodiments, some and/or each of the plurality of anchor members 112 have at least one barb projecting circumferentially therefrom. Some suitable, but non-limiting, examples of materials for the expandable framework 110, the plurality of anchor members 112, etc. are discussed below.

In some embodiments, the plurality of anchor members 112 may provide an anchoring mechanism to aid in retaining the left atrial appendage closure device 100 at a target site within a patient's anatomy (i.e., the left atrial appendage, for example) in the expanded deployed configuration. However, the barb(s) may be configured, positioned, and/or arranged such that engagement of the barb(s) with surrounding tissue at the target site is minimized or avoided. For example, the barb(s) may not puncture, pierce, and/or extend into the surrounding tissue in the expanded deployed configuration. Additionally, in some embodiments, the plurality of anchor members 112 may provide an attachment mechanism for securing the occlusive element 120 to the expandable framework 110.

In some embodiments, the occlusive element 120 may extend distally past at least some of the plurality of anchor members 112. In some embodiments, the occlusive element 120 may extend distally past each and/or all of the plurality of anchor members 112. In at least some embodiments, at least a distal portion of the occlusive element 120 may be attached to the expandable framework 110. In some embodiments, at least some of the plurality of anchor members 112 extend and/or project through the occlusive element 120. In some embodiments, each and/or all of the plurality of anchor members 112 extend and/or project through the occlusive element 120. In some embodiments, the occlusive element 120 may be attached to the expandable framework 110 at some and/or each of the plurality of anchor members 112, for example, by passing some and/or each of the plurality of anchor members 112 through the occlusive element 120.

In some embodiments, the barb and/or the tip portion on some and/or each of the at least some of the plurality of anchor members 112 may be disposed radially outward of the occlusive element 120 and/or exterior of the occlusive element 120 while the base of its respective anchor member is disposed radially inward of and/or interior of the occlusive element 120. The barb may serve to retain the occlusive element 120 on the expandable framework 110, thereby preventing the occlusive element 120 from working loose and/or releasing from the expandable framework 110 as the expandable framework 110 is shifted between the collapsed delivery configuration and the expanded deployed configuration. In some embodiments, attachment of the distal portion of the occlusive element 120 to the expandable framework 110 is devoid of sutures and/or adhesives.

In some embodiments, the occlusive element 120 may be permeable, semi-permeable, or impermeable to blood and/or other fluids, such as water. In some embodiments, the occlusive element 120 may include a polymeric membrane, a metallic or polymeric mesh, a porous filter-like material, or other suitable construction. In some embodiments, the occlusive element 120 may be configured to prevent thrombi (i.e. blood clots, etc.) from passing through the occlusive element 120 and/or exiting the left atrial appendage into the blood stream when the left atrial appendage closure device 100 and/or the expandable framework 110 is disposed within an ostium of the left atrial appendage in the expanded deployed configuration. In some embodiments, the occlusive element 120 may be configured to promote endothelialization across the ostium of the left atrial appendage after implantation of the left atrial appendage closure device 100, thereby effectively removing the left atrial appendage from the patient's circulatory system. Some suitable, but non-limiting, examples of materials for the occlusive element 120 are discussed below.

In some embodiments, the left atrial appendage closure device 100 may include a sensor 140 at least partially disposed within an interior of the expandable framework 110 and axially movable relative to the proximal hub 130 and/or the expandable framework 110. In some alternative embodiments, the left atrial appendage closure device 100 may include a plug and/or a stopper in place of the sensor 140, wherein the plug and/or the stopper is at least partially disposed within the interior of the expandable framework 110 and axially movable relative to the proximal hub 130 and/or the expandable framework 110. In some embodiments, the sensor 140, and/or the plug and/or the stopper, as described and/or positioned as described herein, may be useful for reducing exposed surface area of the proximal hub 130 and/or reducing the risk of thrombus formation.

In at least some embodiments, the sensor 140, and/or the plug and/or the stopper, may be at least partially disposed within the proximal hub 130 in a released configuration of the medical system 10 and/or the left atrial appendage closure device 100, as seen in FIGS. 3 and 4. In the released configuration, the core wire 30 may be disengaged from and/or detached from the left atrial appendage closure device 100 and/or the proximal hub 130, as discussed herein. In some embodiments, a proximal end 142 of the sensor 140, and/or the plug and/or the stopper, may be disposed substantially flush with a proximalmost extent of the proximal hub 130 in the released configuration. In some embodiments, the proximal end 142 of the sensor 140, and/or the plug and/or the stopper, may extend proximal of the proximalmost extent of the proximal hub 130 in the released configuration. For example, in some embodiments, the proximal end 142 of the sensor 140, and/or the plug and/or the stopper, may extend about 1 millimeter (mm), about 2 mm, about 3 mm, about 4 mm, about 5 mm, about 6 mm, about 7 mm, about 8 mm, or about 10 mm proximal of the proximalmost extent of the proximal hub 130 in the released configuration. In one example, the proximal end 142 of the sensor 140, and/or the plug and/or the stopper, may extend about 4 mm to about 5 mm proximal of the proximalmost extent of the proximal hub 130 in the released configuration. Other ranges and/or dimensions are also contemplated. In some embodiments, the proximal end 142 of the sensor 140, and/or the plug and/or the stopper, may have a convex shape extending in the proximal direction. In some embodiments having the proximal end 142 of the sensor 140, and/or the plug and/or the stopper, with a convex shape, a proximalmost extent of the sensor 140, and/or the plug and/or the stopper, may be substantially flush with the proximalmost extent of the proximal hub 130 in the released configuration. In some embodiments having the proximal end 142 of the sensor 140, and/or the plug and/or the stopper, with a convex shape, the proximalmost extent of the sensor 140, and/or the plug and/or the stopper, may extend proximal of the proximalmost extent of the proximal hub 130 in the released configuration.

In some embodiments, having the proximal end 142 of the sensor 140, and/or the plug and/or the stopper, extend proximal of the proximalmost extent of the proximal hub 130 in the released configuration may permit endothelial growth over the occlusive element 120 and/or the ostium of the left atrial appendage without obstructing and/or obscuring the proximal end 142 of the sensor 140, and/or the plug and/or the stopper. In some embodiments, the proximal end 142 of the sensor 140, and/or the plug and/or the stopper, may be disposed distal of the proximalmost extent of the proximal hub 130 and proximal of a distal end of the proximal hub 130 in the released configuration such that the proximal end 142 of the sensor 140, and/or the plug and/or the stopper, is recessed within the proximal hub 130 to permit and/or promote endothelial growth thereover. The skilled artisan will recognize that the type, construction, and capabilities of the sensor 140, and/or the plug and/or the stopper, may be used to determine whether or not endothelial overgrowth should be permitted and/or promoted.

As shown in FIG. 4, the sensor 140, and/or the plug and/or the stopper, may extend distally into the interior of the left atrial appendage closure device 100 and/or the expandable framework 110. In some embodiments, the sensor 140, and/or the plug and/or the stopper, may have a substantially cylindrical outer surface. In some embodiments, the sensor 140, and/or the plug and/or the stopper, may be hollow and/or may include an interior space configured to house components of the sensor 140, and/or the plug and/or the stopper. An overall length of the sensor 140, and/or the plug and/or the stopper, may vary depending on the construction of the sensor 140, and/or the plug and/or the stopper, and/or components disposed within the interior space of the sensor 140, and/or the plug and/or the stopper.

In one example configuration, the sensor 140, and/or the plug and/or the stopper, may include one or more internal components disposed within the interior space. In some embodiments, the sensor 140, and/or the plug and/or the stopper, may be devoid of any internal components. As such, any and/or all of the internal components may be considered optional in any particular example. In some embodiments, the sensor 140 may include a sensing element disposed within the sensor 140, the sensing element being in communication with the proximal end 142 of the sensor 140. In some embodiments, the sensor 140 may be a pressure sensor and/or may include a pressure sensing element. In some embodiments, the proximal end 142 of the sensor 140 may include a diaphragm extending across the proximal end 142 of the sensor 140, and a pressure transfer fluid may be disposed within the proximal end 142 of the sensor 140 between the diaphragm and the sensing element. The sensor 140 may be configured to sense a fluid pressure within a space facing the proximal end 142 of the sensor 140 (e.g., a left atrium) and/or adjacent the proximal end 142 of the sensor 140 when the expandable framework 110 and/or the left atrial appendage closure device 100 is disposed within an ostium of the left atrial appendage in the delivery configuration and/or in the released configuration. In some embodiments, the sensor 140 may be configured to sense and/or detect (and/or the sensor 140 may include a sensing element configured to sense and/or detect) temperature, flow rate, heart rate, electrical signals in the heart, heart rhythm, or other characteristics.

In some embodiments, the sensor 140 may include an integrated circuit board for controlling the sensor 140 and/or other internal components of the sensor 140. In some embodiments, the sensor 140 may include a communication coil disposed within the interior space of the sensor 140. In some embodiments, the communication coil may be configured for bi-directional wireless communication and/or energy transfer. In some embodiments, the sensor 140 may optionally include a battery. In some embodiments, the sensor 140 may be powered "on-demand" via an inductive link. In some embodiments, the communication coil may be and/or may form a part of the inductive link. In some embodiments, the sensor 140 may include a capacitor disposed within the interior space configured to act as a temporary power source for the sensor 140 and/or other internal components of the sensor 140 (during "on-demand" energy transfer to the sensor 140 and/or the left atrial appendage closure device 100, for example). In some embodiments, the communication coil may be wrapped around the battery. In some embodiments, the communication coil may be wrapped around the capacitor. In some embodiments, the communication coil may be a stand-alone feature and/or may be wrapped around an inert and/or non-functional structure to maintain shape and/or form. Other configurations are also contemplated.

In some embodiments utilizing the battery, the battery may be rechargeable. While a direct connection may be used to recharge the battery, such a configuration may be rather invasive to the patient. Accordingly, a wireless (e.g., inductive) recharging capability may be more desirable and far less invasive to the patient. In some embodiments, utilizing the battery, the battery may not be rechargeable. When using a non-rechargeable battery, it may be desirable to use a battery having a lifetime at least as long as the expected remaining lifetime of the patient to avoid needing to replace the battery during a patient's later years when surgical procedures may be more challenging.

FIGS. 5-12 illustrate aspects of an example configuration of the medical system 10. FIGS. 5, 7, 9, and 11 illustrate the medical system 10 and/or the left atrial appendage closure device 100 in the released configuration. In the released configuration, the core wire 30 (not shown) may be disengaged and/or detached from the left atrial appendage closure device 100 and/or the proximal hub 130. FIGS. 6, 8, 10, and 12 illustrate the medical system 10 and/or the left atrial appendage closure device 100 in the unreleased configuration. In the unreleased configuration, the core wire 30 may be at least partially releasably engaged with, attached to, and/or connected to the left atrial appendage closure device 100 and/or the proximal hub 130. In at least some embodiments, the collapsed delivery configuration and/or the expanded deployed configuration may be used and/or applied concurrently and/or interchangeably with the unreleased configuration. For the purpose of this disclosure, any configuration where the core wire 30 is at least partially engaged with the left atrial appendage closure device 100 and/or the proximal hub 130 may be considered an unreleased configuration.

In some embodiments, the proximal hub 130 of the expandable framework 110 may be configured to releasably attach, join, couple, engage, or otherwise connect to the distal end of the core wire 30. In some embodiments, the proximal hub 130 may include a first threaded connection structure 170 configured to and/or adapted to releasably couple with, join to, mate with, or otherwise engage with a second threaded connection structure 180 at the distal end of the core wire 30 in the unreleased configuration of the medical system 10 and/or the left atrial appendage closure device 100, as shown in FIGS. 6, 8, 10, and 12. In some embodiments, the first threaded connection structure 170 may be formed on an inside surface of the proximal hub 130. In some embodiments, the second threaded connection structure 180 may be formed on an outside surface of the core wire 30. Additionally, in some embodiments, the first and/or second connection structure(s) need not be threaded. Other configurations are also contemplated, including but not limited to snap fits, engagement clips, spring features, cooperating protrusions and recesses, etc.

In some embodiments, when the second threaded connection structure 180 is disengaged from the first threaded connection structure 170, and/or when the left atrial appendage closure device 100 and/or the medical system 10 is in the released configuration, the sensor 140 is at least partially disposed within the proximal hub 130. As may be seen in FIGS. 5-12, the sensor 140, and/or the plug and/or the stopper, may be axially movable relative to the proximal hub 130 and/or the expandable framework 110. In some embodiments, when the second threaded connection structure 180 is disengaged from the first threaded connection structure 170, and/or when the left atrial appendage closure device 100 and/or the medical system 10 is in the released configuration, the proximal end 142 of the sensor 140, and/or the plug and/or the stopper, may be substantially flush with the proximalmost extent of the proximal hub 130 in the released configuration, as generally shown in FIGS. 5, 7, 9, and 11. In some embodiments, when the second threaded connection structure 180 is disengaged from the first threaded connection structure 170, and/or when the left atrial appendage closure device 100 and/or the medical system 10 is in the released configuration, the proximal end 142 of the sensor 140, and/or the plug and/or the stopper, may extend proximal of the proximalmost extent of the proximal hub 130 in the released configuration, as shown in phantom at reference number 143 in FIGS. 5, 7, 9, and 11. When the second threaded connection structure 180 is engaged with the first threaded connection structure 170, and/or when the left atrial appendage closure device 100 and/or the medical system 10 is in the unreleased configuration, a distal end of the second threaded connection structure 180 and/or the distal end of the core wire 30 may engage the proximal end 142 of the sensor 140, and/or the plug and/or the stopper, as seen in FIGS. 6, 8, 10, and 12.

In some embodiments, the distal end of the second threaded connection structure 180 and/or the distal end of the core wire 30 may have a concave shape extending proximally. The concave shape may be configured to engage, abut, and/or mate with the convex shape of the proximal end 142 of the sensor 140, and/or the plug and/or the stopper, when the second threaded connection structure 180 is engaged with the first threaded connection structure 170, and/or when the left atrial appendage closure device 100 and/or the medical system 10 is in the unreleased configuration. In some embodiments, the distal end of the second threaded connection structure 180 and/or the distal end of the core wire 30 may be in direct contact with the proximal end 142 of the sensor 140, and/or the plug and/or the stopper, when the second threaded connection structure 180 is engaged with the first threaded connection structure 170, and/or when the left atrial appendage closure device 100 and/or the medical system 10 is in the unreleased configuration.

In some embodiments, when the second threaded connection structure 180 is disengaged from the first threaded connection structure 170, and/or when the left atrial appendage closure device 100 and/or the medical system 10 is in the released configuration, the sensor 140, and/or the plug and/or the stopper, may occupy at least 50% of a volume defined by the first threaded connection structure 170. In some embodiments, when the second threaded connection structure 180 is disengaged from the first threaded connection structure 170, and/or when the left atrial appendage closure device 100 and/or the medical system 10 is in the released configuration, the sensor 140, and/or the plug and/or the stopper, may occupy at least 60% of the volume defined by the first threaded connection structure 170. In some embodiments, when the second threaded connection structure 180 is disengaged from the first threaded connection structure 170, and/or when the left atrial appendage closure device 100 and/or the medical system 10 is in the released configuration, the sensor 140, and/or the plug and/or the stopper, may occupy at least 70% of the volume defined by the first threaded connection structure 170. In some embodiments, when the second threaded connection structure 180 is disengaged from the first threaded connection structure 170, and/or when the left atrial appendage closure device 100 and/or the medical system 10 is in the released configuration, the sensor 140, and/or the plug and/or the stopper, may occupy at least 80% of the volume defined by the first threaded connection structure 170. In some embodiments, when the second threaded connection structure 180 is disengaged from the first threaded connection structure 170, and/or when the left atrial appendage closure device 100 and/or the medical system 10 is in the released configuration, the sensor 140, and/or the plug and/or the stopper, may occupy at least 90% of the volume defined by the first threaded connection structure 170.

In some embodiments, the sensor 140, and/or the plug and/or the stopper, may include an annular ledge 144 extending radially outward from the outer surface of the sensor 140, and/or the plug and/or the stopper. In some embodiments, the annular ledge 144 may be oriented substantially perpendicular to the central longitudinal axis and/or to the outer surface of the sensor 140, and/or the plug and/or the stopper. In at least some embodiments, the outer surface of the sensor 140, and/or the plug and/or the stopper, may be substantially cylindrical in shape. The annular ledge 144 may extend circumferentially about and/or around the outer surface of the sensor 140, and/or the plug and/or the stopper. The annular ledge 144 may be disposed between and axially spaced apart from the proximal end 142 of the sensor 140, and/or the plug and/or the stopper, and a distal end of the sensor 140, and/or the plug and/or the stopper. In some embodiments, the annular ledge 144 may be axially closer to the distal end and/or the distalmost extent of the proximal hub 130 in the released configuration than in the unreleased configuration. In some embodiments, the annular ledge 144 may be configured to engage and/or abut the proximal hub 130 when the left atrial appendage closure device 100 and/or the medical system 10 is in the released configuration. In some embodiments, the annular ledge 144 may be configured to engage and/or abut the distal end of the proximal hub 130 when the left atrial appendage closure device 100 and/or the medical system 10 is in the released configuration. In some embodiments, the annular ledge 144 may be discontinuous about and/or around the outer surface of the sensor 140, and/or the plug and/or the stopper. For example, in some embodiments, the annular ledge 144 may comprise a plurality of individual ledges spaced circumferentially about and/or around the outer surface of the sensor 140, and/or the plug and/or the stopper, at a common axial location between the proximal end 142 of the sensor 140, and/or the plug and/or the stopper, and the distal end of the sensor 140, and/or the plug and/or the stopper. In some embodiments, the annular ledge 144 may include a proximal taper, a distal taper, or both to facilitate axial movement of the sensor 140, and/or the plug and/or the stopper, relative to the proximal hub 130 and/or to aid in aligning the sensor 140, and/or the plug and/or the stopper, 40 with the first threaded connection structure 170 and/or the volume defined by the first threaded connection structure 170. In some embodiments, the annular ledge 144 may include the proximal taper, the distal taper, or both to urge the sensor 140, and/or the plug and/or the stopper, into coaxial alignment with the central longitudinal axis of the left atrial appendage closure device 100 and/or the expandable framework 110.

Figure 5:
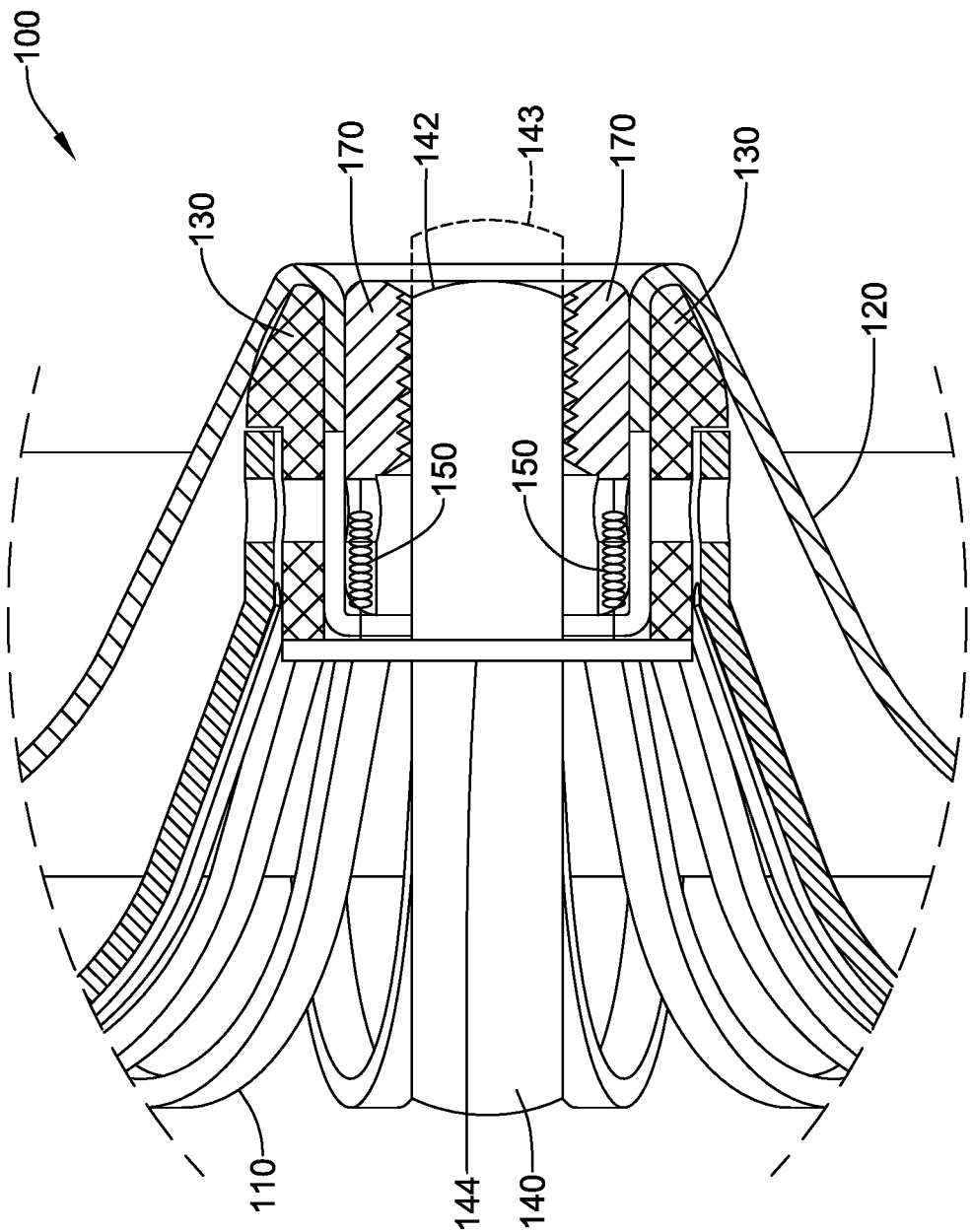
FIG. 5 is a partial cutaway view of an example configuration of the left atrial appendage closure device in a released configuration.
Figure 6:
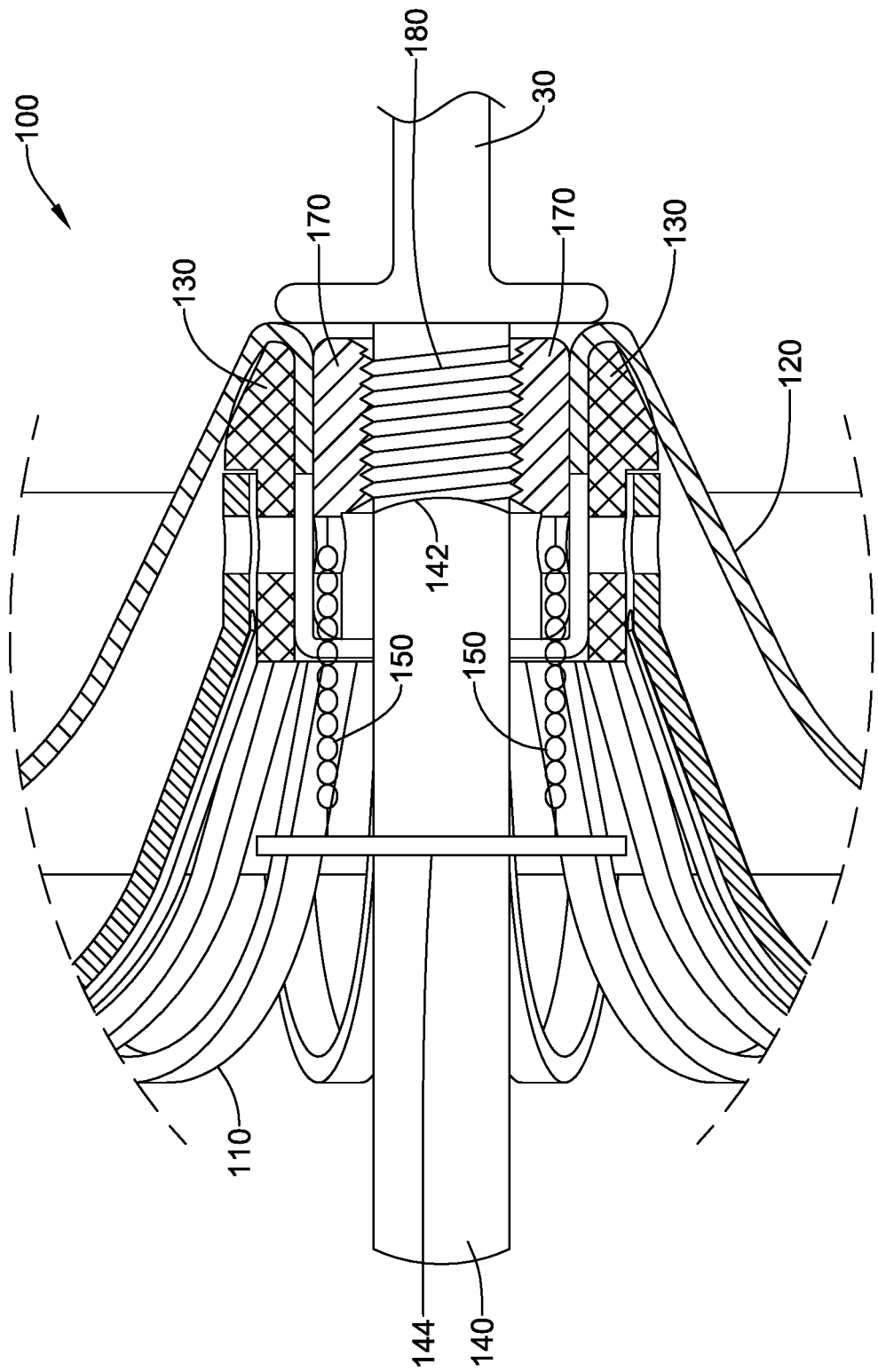
FIG. 6 is a partial cutaway view of the example configuration of the left atrial appendage closure device of FIG. 5 in an unreleased configuration.
Figure 7:
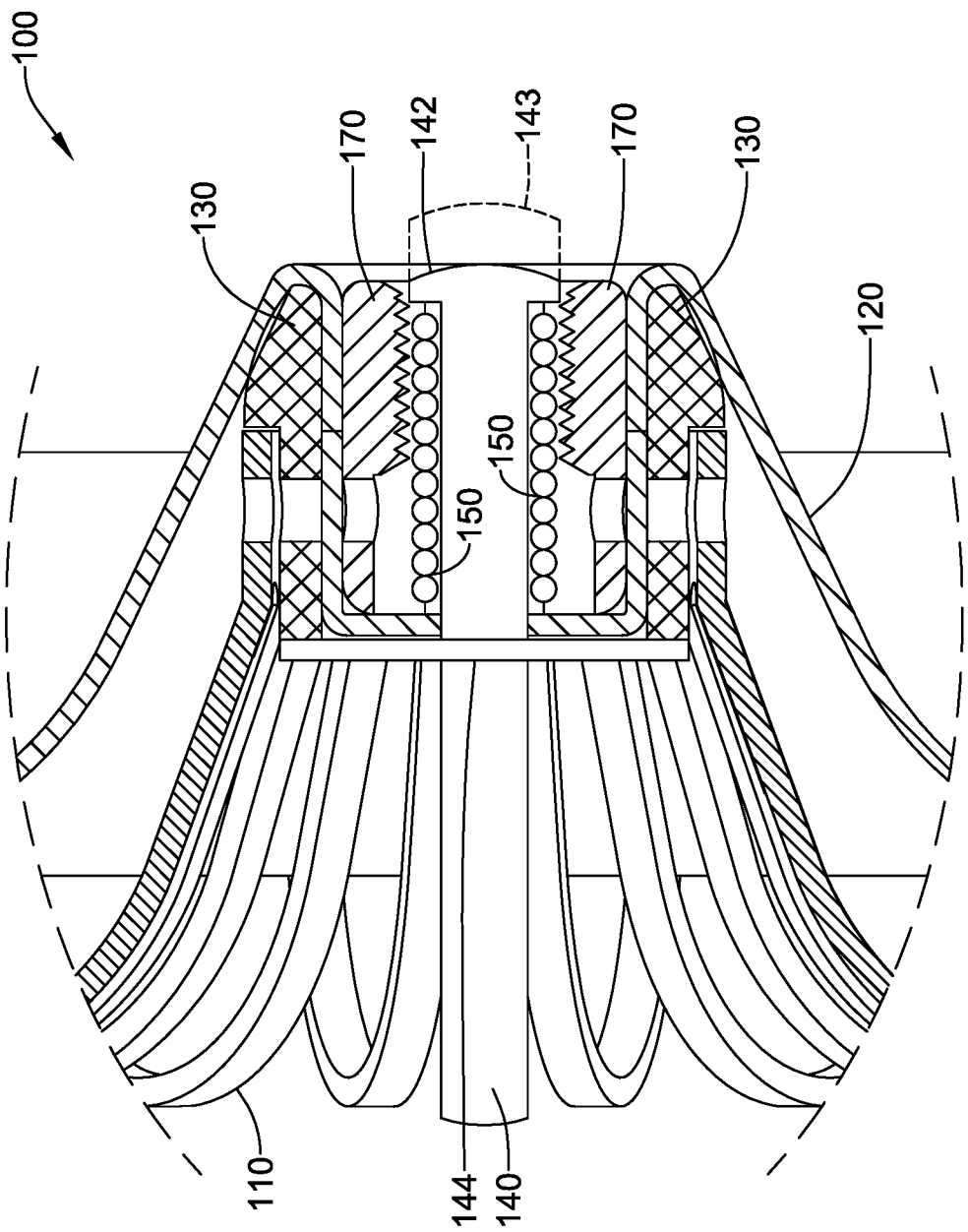
FIG. 7 is a partial cutaway view of an example configuration of the left atrial appendage closure device in a released configuration.
Figure 8:
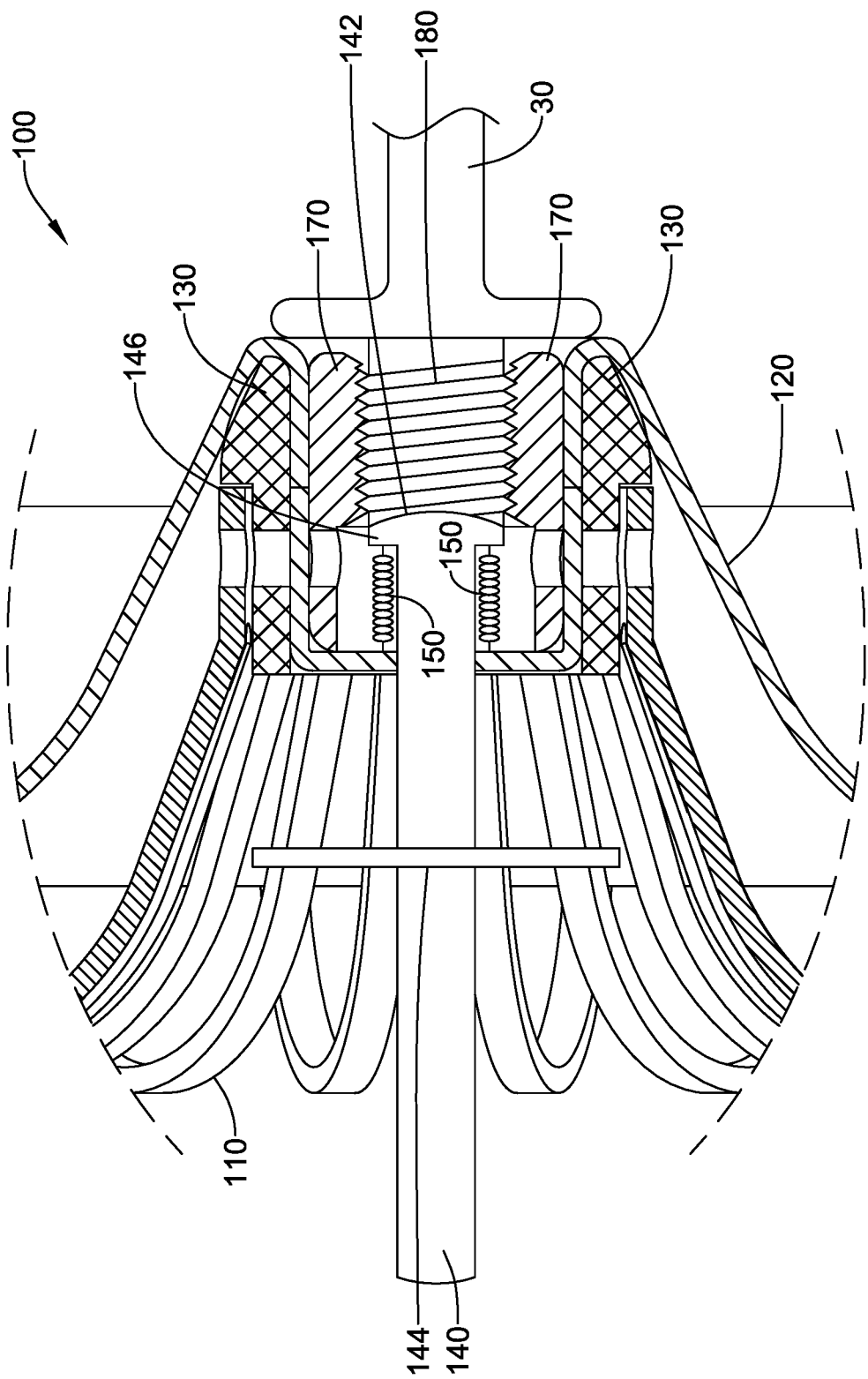
FIG. 8 is a partial cutaway view of the example configuration of the left atrial appendage closure device of FIG. 7 in an unreleased configuration.
Figure 9:
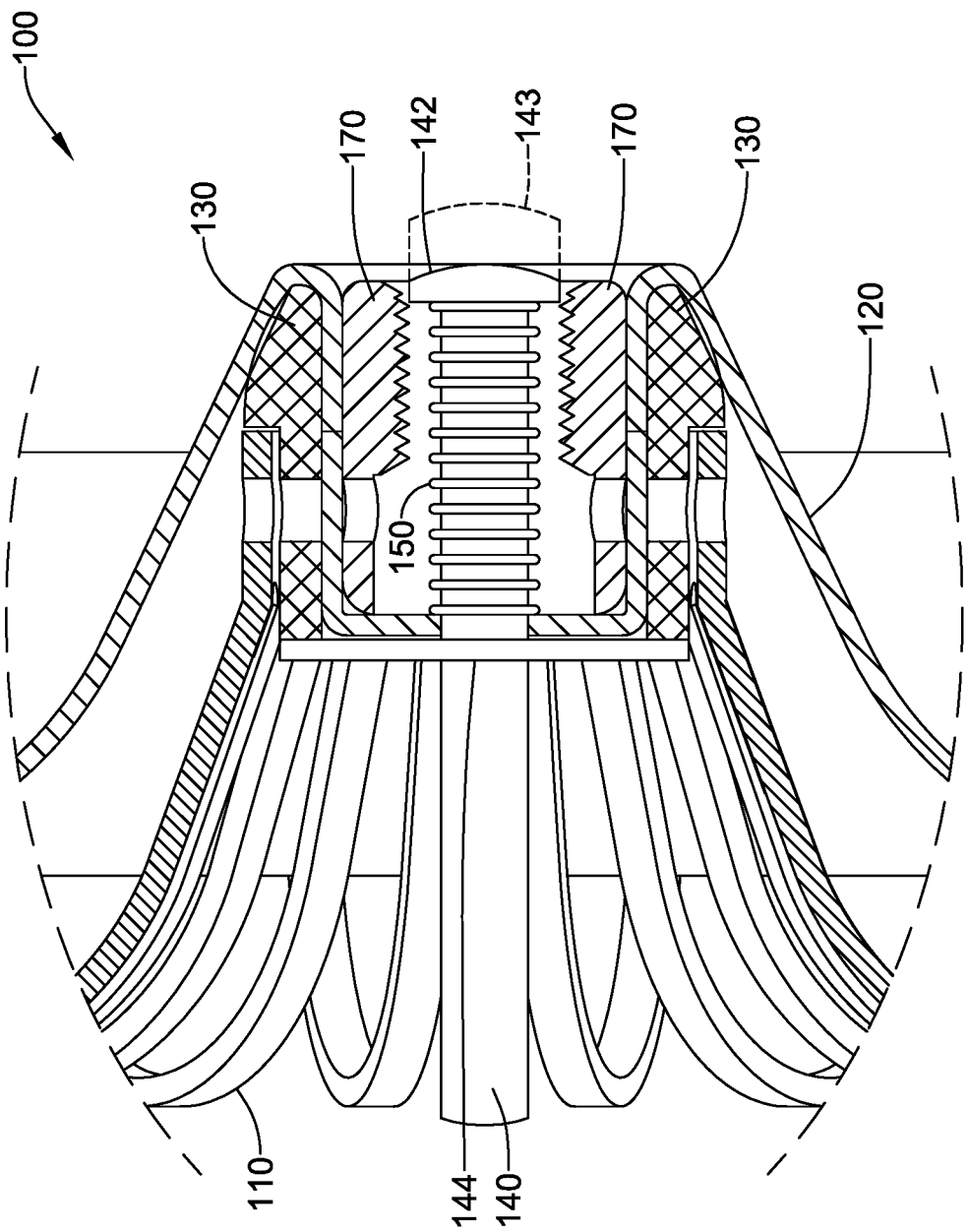
FIG. 9 is a partial cutaway view of an example configuration of the left atrial appendage closure device in a released configuration.
Figure 10:
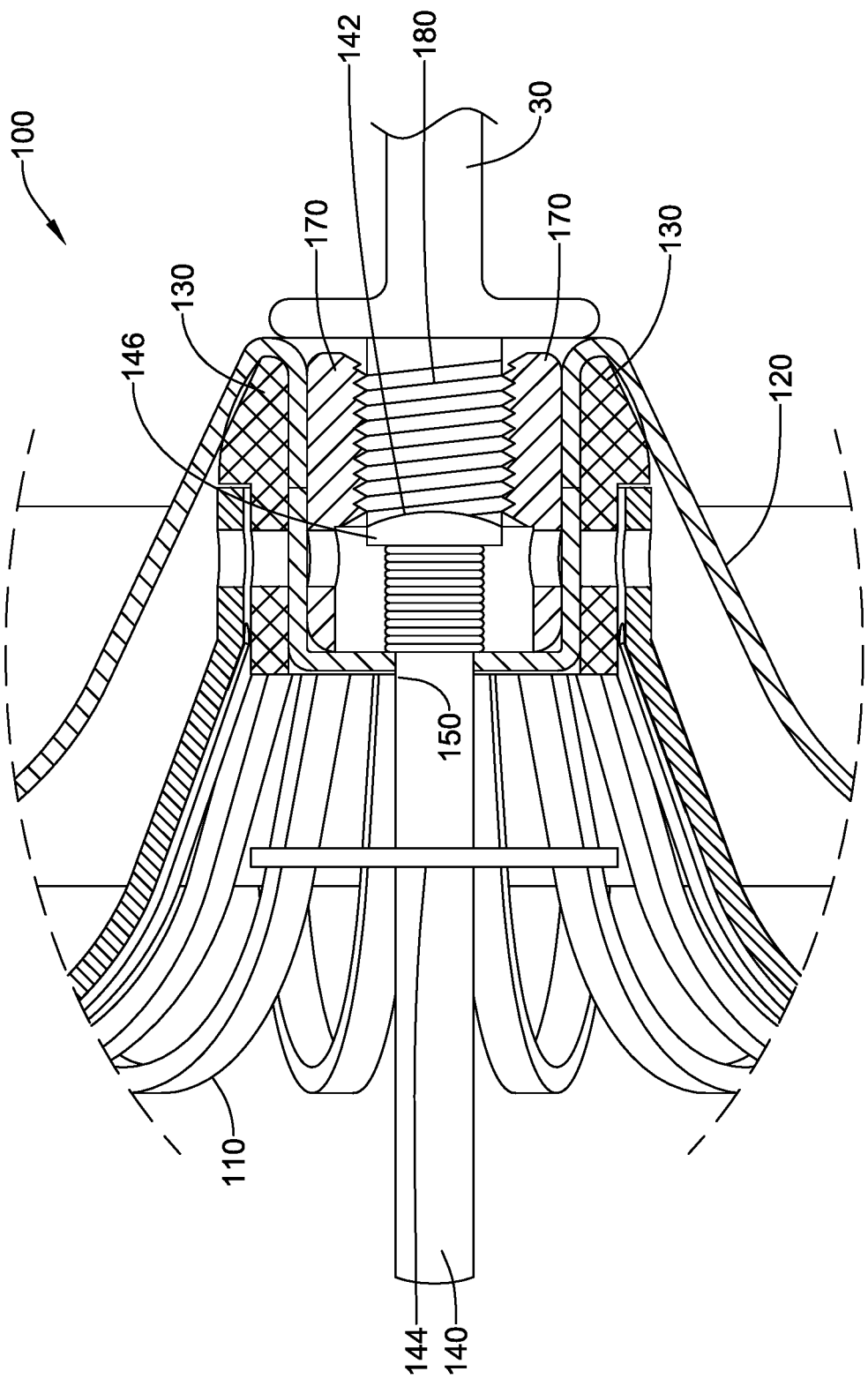
FIG. 10 is a partial cutaway view of the example configuration of the left atrial appendage closure device of FIG. 9 in an unreleased configuration.

In some embodiments, the left atrial appendage closure device 100 may include at least one spring 150 engaged with the proximal hub 130 and the sensor 140, and/or the plug and/or the stopper. In some embodiments, the at least one spring 150 may be coupled to the proximal hub 130 and/or the sensor 140, and/or the plug and/or the stopper. In some embodiments, the at least one spring 150 may be fixedly attached to an inner surface of the proximal hub 130. In some embodiments, the at least one spring may be fixedly attached to the sensor 140, and/or the plug and/or the stopper, and/or the annular ledge 144. In some embodiments, the at least one spring 150 may include a plurality of springs spaced circumferentially about and/or around the sensor 140, and/or the plug and/or the stopper, and/or the outer surface of the sensor 140. In some embodiments, the at least one spring 150 may each include and/or be formed as a coil spring, a mesh network with a spring function, or other suitable structure capable of providing a spring-like function. In some embodiments, the at least one spring 150 may include one coil spring disposed coaxially about the sensor 140, and/or the plug and/or the stopper, as seen in FIGS. 9 and 10. In some embodiments, the at least one spring 150 may be disposed between the proximal hub 130 and the sensor 140, and/or the plug and/or the stopper, in tension, as seen in FIGS. 5 and 6. In some embodiments, the at least one spring 150 may be disposed between the proximal hub 130 and the annular ledge 144 of the sensor 140, and/or the plug and/or the stopper, in tension. In some embodiments, the at least one spring 150 may be disposed between the proximal hub 130 and the sensor 140, and/or the plug and/or the stopper, in compression, as seen in FIGS. 7-10. In some embodiments, the at least one spring 150 may be disposed between the proximal hub 130 and the annular ledge 144 of the sensor 140, and/or the plug and/or the stopper, in compression. In some embodiments, the at least one spring 150 may be disposed between the proximal hub 130 and a proximal flange 146 disposed at the proximal end 142 of the sensor 140, and/or the plug and/or the stopper, as seen in FIGS. 9 and 10. The proximal flange 146 may extend radially outward from the outer surface of the sensor 140, and/or the plug and/or the stopper, in a manner similar to the annular ledge 144. In some embodiments, the proximal flange 146 may extend substantially perpendicular to the central longitudinal axis and/or to the outer surface of the sensor 140, and/or the plug and/or the stopper.

Figure 11:
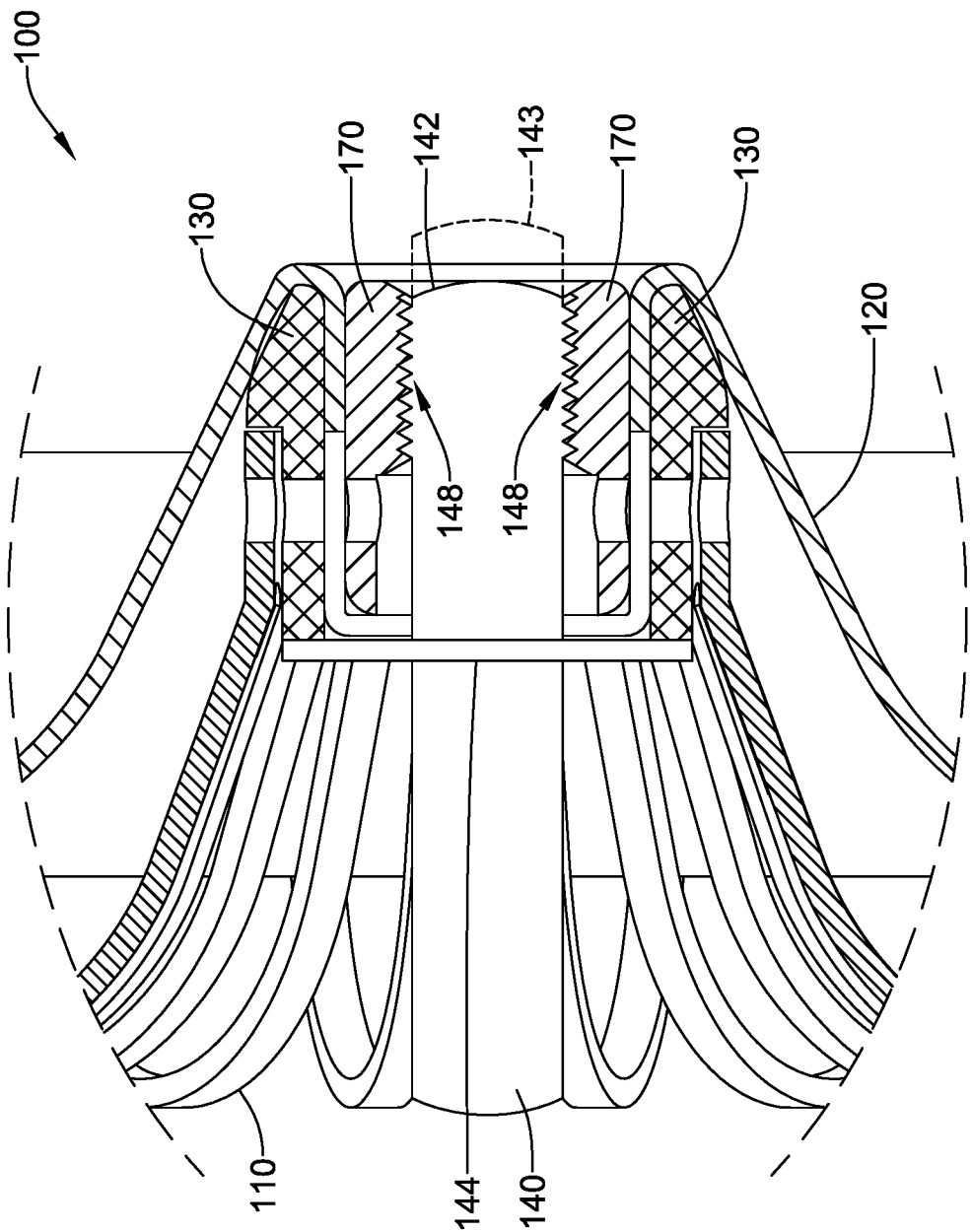
FIG. 11 is a partial cutaway view of an example configuration of the left atrial appendage closure device in a released configuration.
Figure 12:
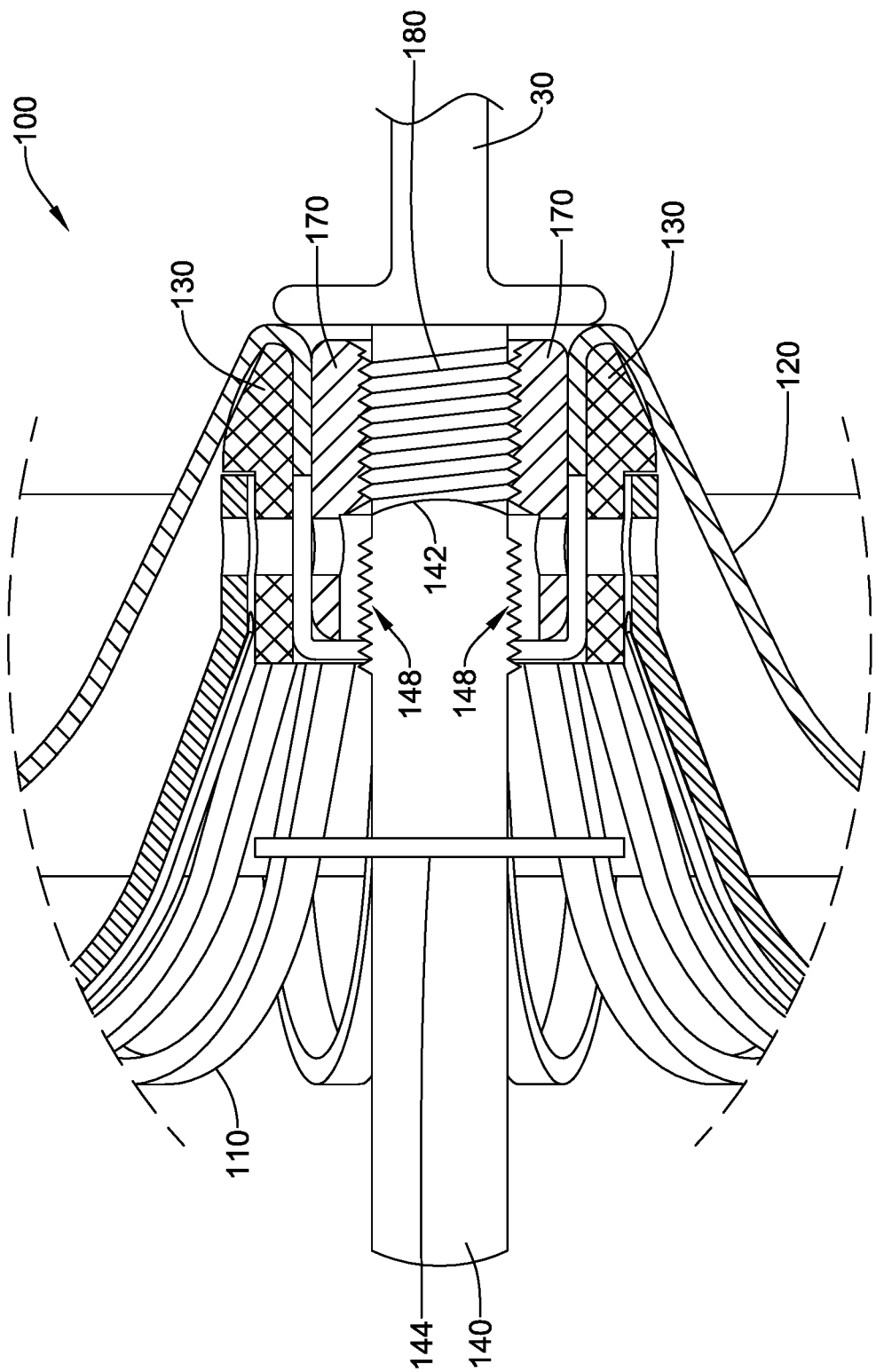
FIG. 12 is a partial cutaway view of the example configuration of the left atrial appendage closure device of FIG. 11 in an unreleased configuration.

In some embodiments, the sensor 140, and/or the plug and/or the stopper, may include a third threaded connection structure 148 formed on the outside surface of the sensor 140, and/or the plug and/or the stopper, proximate the proximal end 142 and configured to threadably couple the sensor 140, and/or the plug and/or the stopper, to the first threaded connection structure 170, as seen in FIG. 11. In some embodiments, when the left atrial appendage closure device 100 is not in the released configuration, rotation of the core wire 30 relative to the proximal hub 130 may rotate the sensor 140, and/or the plug and/or the stopper, relative to the proximal hub 130 to axially move the sensor 140, and/or the plug and/or the stopper, relative to the proximal hub 130 and/or the expandable framework 110, as seen in FIG. 12. In some embodiments, the first threaded connection structure 170 and the second threaded connection structure 180 may be configured such that when the left atrial appendage closure device 100 is not in the released configuration, clockwise rotation of the core wire 30 relative to the proximal hub 130 may advance the second threaded connection structure 180 distally within and with respect to the proximal hub 130 and the first threaded connection structure 170, and counterclockwise rotation of the core wire 30 relative to the proximal hub 130 may withdraw the second threaded connection structure 180 proximally within and with respect to the proximal hub 130 and the first threaded connection structure 170. In an alternative configuration, the first threaded connection structure 170 and the second threaded connection structure 180 may be configured such that when the left atrial appendage closure device 100 is not in the released configuration, counterclockwise rotation of the core wire 30 relative to the proximal hub 130 may advance the second threaded connection structure 180 distally within and with respect to the proximal hub 130 and the first threaded connection structure 170, and clockwise rotation of the core wire 30 relative to the proximal hub 130 may withdraw the second threaded connection structure 180 proximally within and with respect to the proximal hub 130 and the first threaded connection structure 170.

Figure 13A:
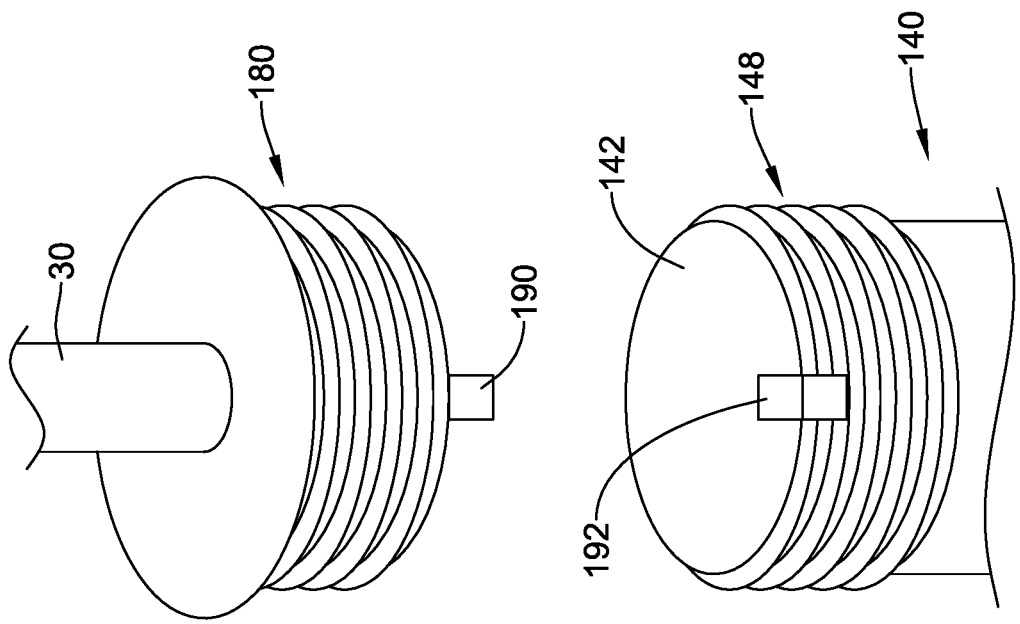
FIG. 13A-13C illustrate aspects of the medical system associated with the example configuration of the left atrial appendage closure device of FIG. 11.
Figure 13B:
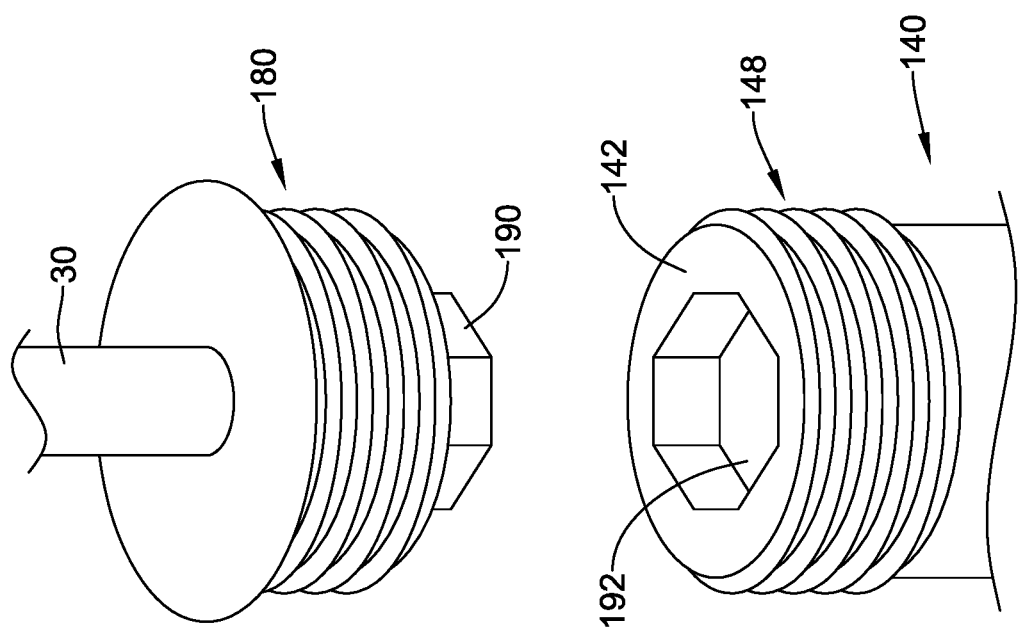
Figure 13C:
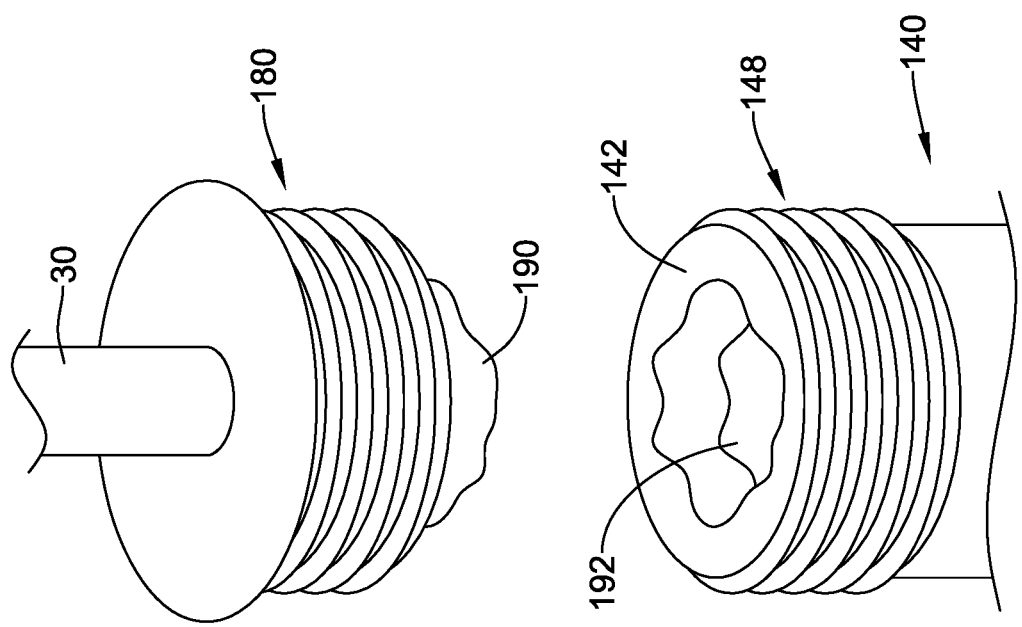

In some embodiments, the distal end of the core wire 30 and/or the second threaded connection structure 180 may include a first locking element 190 formed thereon, as seen in FIGS. 13A-13C. In at least some embodiments, the first locking element 190 may extend distally from the second threaded connection structure 180. In some embodiments, the proximal end 142 of the sensor 140, and/or the plug and/or the stopper, may include a second locking element 192 formed thereon. In some embodiments, the second locking element 192 may extend distally into the proximal end 142 of the sensor 140, and/or the plug and/or the stopper, and/or the second locking element 192 may be recessed into the proximal end 142 of the sensor 140, and/or the plug and/or the stopper.

In one example configuration shown in FIG. 13A, the first locking element 190 may be a projection key extending axially parallel to the central longitudinal axis. The projection key may be disposed along a perimeter of the second threaded connection structure 180. The second locking element 192 may be a notch formed in the proximal end 142 of the sensor 140, and/or the plug and/or the stopper, proximate the outside surface of the sensor 140, and/or the plug and/or the stopper. The projection key and the notch may be complimentary shapes configured such that the projection key is able to engage with and nest inside of the notch while preventing relative rotation therebetween. The projection key and the notch may each include flat sides configured to transmit rotational force therebetween such that rotational force applied to the core wire 30 is transmitted through the projection key and the notch to the sensor 140, and/or the plug and/or the stopper. Accordingly, when the left atrial appendage closure device 100 is not in the released configuration, rotation applied to the core wire 30 results in corresponding rotation and axial movement of the sensor 140, and/or the plug and/or the stopper, relative to the proximal hub 130.

In another example configuration shown in FIG. 13B, the first locking element 190 may be a hex key extending axially parallel to the central longitudinal axis. The hex key may be disposed coaxially with second threaded connection structure 180 and/or the core wire 30. The second locking element 192 may be a hex recess formed in the proximal end 142 of the sensor 140, and/or the plug and/or the stopper, coaxially with the sensor 140, and/or the plug and/or the stopper. The hex key and the hex recess may be complimentary shapes configured such that the hex key is able to engage with and nest inside of the hex recess while preventing relative rotation therebetween. The hex key and the hex recess may each include straight sides (e.g., parallel to the central longitudinal axis) configured to transmit rotational force therebetween such that rotational force applied to the core wire 30 is transmitted through the hex key and the hex recess to the sensor 140, and/or the plug and/or the stopper. Accordingly, when the left atrial appendage closure device 100 is not in the released configuration, rotation applied to the core wire 30 results in corresponding rotation and axial movement of the sensor 140, and/or the plug and/or the stopper, relative to the proximal hub 130.

In another example configuration shown in FIG. 13C, the first locking element 190 may be a wave key extending axially parallel to the central longitudinal axis. The wave key may be disposed coaxially with second threaded connection structure 180 and/or the core wire 30. The second locking element 192 may be a wave recess formed in the proximal end 142 of the sensor 140, and/or the plug and/or the stopper, coaxially with the sensor 140, and/or the plug and/or the stopper. The wave key and the wave recess may be complimentary shapes configured such that the wave key is able to engage with and nest inside of the wave recess while preventing relative rotation therebetween. The wave key and the wave recess may each include straight sides (e.g., parallel to the central longitudinal axis) configured to transmit rotational force therebetween such that rotational force applied to the core wire 30 is transmitted through the wave key and the wave recess to the sensor 140, and/or the plug and/or the stopper. Accordingly, when the left atrial appendage closure device 100 is not in the released configuration, rotation applied to the core wire 30 results in corresponding rotation and axial movement of the sensor 140, and/or the plug and/or the stopper, relative to the proximal hub 130.

The configurations shown in FIGS. 13A-13C are only examples and are not intended to be limiting. Other configurations and/or complimentary shapes including but not limited to a star shape, a square or rectangular shape, a triangular shape, a polygonal shape having a number sides not already mentioned here, an oval shape, irregular shapes, and/or other shapes that may prevent relative rotation between the first locking element 190 and the second locking element 192 are also contemplated for use as the first locking element 190 and the second locking element 192.

In addition or alternatively to any configuration described herein, the core wire 30 may include at least one aperture extending through a side wall of the core wire into a hollow portion extending to the distal end of the core wire 30. In the unreleased configuration, the at least one aperture may be disposed proximal of the sensor 140, and/or the plug and/or the stopper. The at least one aperture may permit fluid communication between an exterior of the core wire 30 and the proximal end 142 of the sensor 140, and/or the plug and/or the stopper. This may be useful when the practitioner wants to detect and/or measure left atrial pressure and/or other characteristics with the sensor 140 prior to releasing the left atrial appendage closure device 100.

Figure 14:
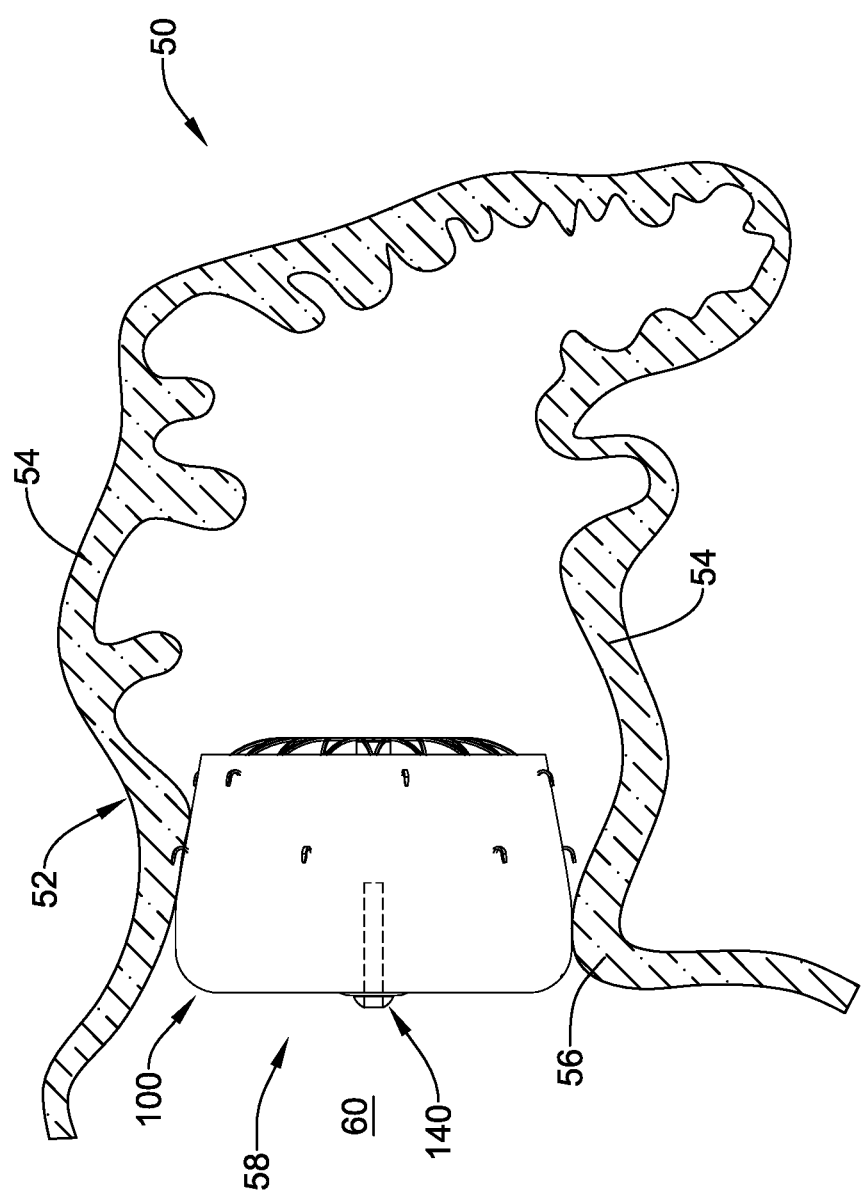
FIG. 14 illustrates the left atrial appendage closure device disposed within the ostium of a left atrial appendage of a patient's heart.

FIG. 14 is a partial cross-sectional view of an example left atrial appendage 50, which may be attached to and in fluid communication with a left atrium 60 of a patient's heart. In some patients, the left atrial appendage 50 may have a complex geometry and/or irregular surface area. Skilled artisans will recognize that the illustrated left atrial appendage is merely one of many possible shapes and sizes for the left atrial appendage 50, which may vary from patient to patient. Skilled artisans will also recognize that the medical devices, systems, and methods disclosed herein may be adapted for various sizes and shapes of the left atrial appendage 50, as necessary. The left atrial appendage 50 may include a generally longitudinal axis arranged along a depth of a main body 52 of the left atrial appendage 50. The main body 52 may include a wall 54 and an ostium 56 forming a proximal mouth 58. In some embodiments, a lateral extent of the ostium 56 and/or the wall 54 may be smaller or less than a depth of the main body 52 along the longitudinal axis, or a depth of the main body 52 may be greater than a lateral extent of the ostium 56 and/or the wall 54. In some embodiments, the left atrial appendage 50 may include a tail-like element associated with a distal portion of the main body 52, which element may protrude radially or laterally away from the main body 52.

As shown in FIG. 14, the left atrial appendage closure device 100 may be implanted within the ostium 56 of the left atrial appendage 50 to close off the proximal mouth 58 and substantially and/or completely sealing off the left atrial appendage 50 from the left atrium 60 and/or the patient's circulatory system. As noted herein, the sensor 140, and/or the plug and/or the stopper, may face toward the left atrium 60. In at least some embodiments, the sensor 140 may be a pressure sensor configured to sense fluid pressure within the left atrium 60 when the left atrial appendage closure device 100 is disposed within the ostium 56 of the left atrial appendage 50 in the released configuration.

The materials that can be used for the various components of the medical system 10 and/or the left atrial appendage closure device 100 and the various elements thereof disclosed herein may include those commonly associated with medical devices. For simplicity purposes, the following discussion refers to the medical system. However, this is not intended to limit the devices and methods described herein, as the discussion may be applied to other elements, members, components, or devices disclosed herein, such as, but not limited to, the core wire 30, the delivery catheter 40, the left atrial appendage closure device 100, the expandable framework 110, the occlusive element 120, the proximal hub 130, the sensor 140, and/or elements or components thereof.

In some embodiments, the medical system and/or components thereof may be made from a metal, metal alloy, polymer (some examples of which are disclosed below), a metal-polymer composite, ceramics, combinations thereof, and the like, or other suitable material.

Some examples of suitable polymers may include polytetrafluoroethylene (PTFE), ethylene tetrafluoroethylene (ETFE), fluorinated ethylene propylene (FEP), polyoxymethylene (POM, for example, DELRIN® available from DuPont), polyether block ester, polyurethane (for example, Polyurethane 85A), polypropylene (PP), polyvinylchloride (PVC), polyether-ester (for example, ARNITEL® available from DSM Engineering Plastics), ether or ester based copolymers (for example, butylene/poly(alkylene ether) phthalate and/or other polyester elastomers such as HYTREL® available from DuPont), polyamide (for example, DURETHAN® available from Bayer or CRISTAMID® available from Elf Atochem), elastomeric polyamides, block polyamide/ethers, polyether block amide (PEBA, for example available under the trade name PEBAX®), ethylene vinyl acetate copolymers (EVA), silicones, polyethylene (PE), MARLEX® high-density polyethylene, MARLEX® low-density polyethylene, linear low density polyethylene (for example REXELL®), polyester, polybutylene terephthalate (PBT), polyethylene terephthalate (PET), polytrimethylene terephthalate, polyethylene naphthalate (PEN), polyetheretherketone (PEEK), polyimide (PI), polyetherimide (PEI), polyphenylene sulfide (PPS), polyphenylene oxide (PPO), poly paraphenylene terephthalamide (for example, KEVLAR®), polysulfone, nylon, nylon-12 (such as GRILAMID® available from EMS American Grilon), perfluoro (propyl vinyl ether) (PFA), ethylene vinyl alcohol, polyolefin, polystyrene, epoxy, polyvinylidene chloride (PVdC), poly(styrene-b-isobutylene-b-styrene) (for example, SIBS and/or SIBS 50A), polycarbonates, polyurethane silicone copolymers (for example, ElastEon® from Aortech Biomaterials or ChronoSil® from AdvanSource Biomaterials), biocompatible polymers, other suitable materials, or mixtures, combinations, copolymers thereof, polymer/metal composites, and the like. In some embodiments the sheath can be blended with a liquid crystal polymer (LCP). For example, the mixture can contain up to about 6 percent LCP.

Some examples of suitable metals and metal alloys include stainless steel, such as 304V, 304L, and 316LV stainless steel; mild steel; nickel-titanium alloy such as linear-elastic and/or super-elastic nitinol; other nickel alloys such as nickel-chromium-molybdenum alloys (e.g., UNS: N06625 such as INCONEL® 625, UNS: N06022 such as HASTELLOY® C-22®, UNS: N10276 such as HASTELLOY® C276®, other HASTELLOY® alloys, and the like), nickel-copper alloys (e.g., UNS: N04400 such as MONEL® 400, NICKELVAC® 400, NICORROS® 400, and the like), nickel-cobalt-chromium-molybdenum alloys (e.g., UNS: R30035 such as MP35-N® and the like), nickel-molybdenum alloys (e.g., UNS: N10665 such as HASTELLOY® ALLOY B2®), other nickel-chromium alloys, other nickel-molybdenum alloys, other nickel-cobalt alloys, other nickel-iron alloys, other nickel-copper alloys, other nickel-tungsten or tungsten alloys, and the like; cobalt-chromium alloys; cobalt-chromium-molybdenum alloys (e.g., UNS: R30003 such as ELGILOY®, PHYNOX®, and the like); platinum enriched stainless steel; titanium; platinum; palladium; gold; combinations thereof; or any other suitable material.

In some embodiments, a linear elastic and/or non-super-elastic nickel-titanium alloy may be in the range of about 50 to about 60 weight percent nickel, with the remainder being essentially titanium. In some embodiments, the composition is in the range of about 54 to about 57 weight percent nickel. One example of a suitable nickel-titanium alloy is FHP-NT alloy commercially available from Furukawa Techno Material Co. of Kanagawa, Japan. Other suitable materials may include ULTANIUM™ (available from Neo-Metrics) and GUM METAL™ (available from Toyota). In some other embodiments, a superelastic alloy, for example a superelastic nitinol can be used to achieve desired properties.

In at least some embodiments, portions or all of the medical system and/or components thereof, may also be doped with, made of, or otherwise include a radiopaque material. Radiopaque materials are understood to be materials capable of producing a relatively bright image on a fluoroscopy screen or another imaging technique during a medical procedure. This relatively bright image aids the user of the medical system in determining its location. Some examples of radiopaque materials can include, but are not limited to, gold, platinum, palladium, tantalum, tungsten alloy, polymer material loaded with a radiopaque filler, and the like. Additionally, other radiopaque marker bands and/or coils may also be incorporated into the design of the medical system to achieve the same result.

In some embodiments, a degree of Magnetic Resonance Imaging (Mill) compatibility is imparted into the medical system and/or other elements disclosed herein. For example, the medical system and/or components or portions thereof may be made of a material that does not substantially distort the image and create substantial artifacts (i.e., gaps in the image). Certain ferromagnetic materials, for example, may not be suitable because they may create artifacts in an MRI image. The medical system or portions thereof may also be made from a material that the Mill machine can image. Some materials that exhibit these characteristics include, for example, tungsten, cobalt-chromium-molybdenum alloys (e.g., UNS: R30003 such as ELGILOY®, PHYNOX®, and the like), nickel-cobalt-chromium-molybdenum alloys (e.g., UNS: R30035 such as MP35-N® and the like), nitinol, and the like, and others.

In some embodiments, the medical system and/or other elements disclosed herein may include a fabric material disposed over or within the structure. The fabric material may be composed of a biocompatible material, such a polymeric material or biomaterial, adapted to promote tissue ingrowth. In some embodiments, the fabric material may include a bioabsorbable material. Some examples of suitable fabric materials include, but are not limited to, polyethylene glycol (PEG), nylon, polytetrafluoroethylene (PTFE, ePTFE), a polyolefinic material such as a polyethylene, a polypropylene, polyester, polyurethane, and/or blends or combinations thereof.

In some embodiments, the medical system and/or other elements disclosed herein may include and/or be formed from a textile material. Some examples of suitable textile materials may include synthetic yarns that may be flat, shaped, twisted, textured, pre-shrunk or un-shrunk. Synthetic biocompatible yarns suitable for use in the present disclosure include, but are not limited to, polyesters, including polyethylene terephthalate (PET) polyesters, polypropylenes, polyethylenes, polyurethanes, polyolefins, polyvinyls, polymethylacetates, polyamides, naphthalene dicarboxylene derivatives, natural silk, and polytetrafluoroethylenes. Moreover, at least one of the synthetic yarns may be a metallic yarn or a glass or ceramic yarn or fiber. Useful metallic yarns include those yarns made from or containing stainless steel, platinum, gold, titanium, tantalum or a Ni—Co—Cr-based alloy. The yarns may further include carbon, glass or ceramic fibers. Desirably, the yarns are made from thermoplastic materials including, but not limited to, polyesters, polypropylenes, polyethylenes, polyurethanes, polynaphthalenes, polytetrafluoroethylenes, and the like. The yarns may be of the multifilament, monofilament, or spun types. The type and denier of the yarn chosen may be selected in a manner which forms a biocompatible and implantable prosthesis and, more particularly, a vascular structure having desirable properties.

In some embodiments, the medical system and/or other elements disclosed herein may include and/or be treated with a suitable therapeutic agent. Some examples of suitable therapeutic agents may include anti-thrombogenic agents (such as heparin, heparin derivatives, urokinase, and PPack (dextrophenylalanine proline arginine chloromethylketone)); anti-proliferative agents (such as enoxaparin, angiopeptin, monoclonal antibodies capable of blocking smooth muscle cell proliferation, hirudin, and acetylsalicylic acid); anti-inflammatory agents (such as dexamethasone, prednisolone, corticosterone, budesonide, estrogen, sulfasalazine, and mesalamine); antineoplastic/antiproliferative/anti-mitotic agents (such as paclitaxel, 5-fluorouracil, cisplatin, vinblastine, vincristine, epothilones, endostatin, angiostatin and thymidine kinase inhibitors); anesthetic agents (such as lidocaine, bupivacaine, and ropivacaine); anti-coagulants (such as D-Phe-Pro-Arg chloromethyl keton, an RGD peptide-containing compound, heparin, anti-thrombin compounds, platelet receptor antagonists, anti-thrombin antibodies, anti-platelet receptor antibodies, aspirin, prostaglandin inhibitors, platelet inhibitors, and tick antiplatelet peptides); vascular cell growth promoters (such as growth factor inhibitors, growth factor receptor antagonists, transcriptional activators, and translational promoters); vascular cell growth inhibitors (such as growth factor inhibitors, growth factor receptor antagonists, transcriptional repressors, translational repressors, replication inhibitors, inhibitory antibodies, antibodies directed against growth factors, bifunctional molecules consisting of a growth factor and a cytotoxin, bifunctional molecules consisting of an antibody and a cytotoxin); cholesterol-lowering agents; vasodilating agents; and agents which interfere with endogenous vasoactive mechanisms.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments. The disclosure's scope is, of course, defined in the language in which the appended claims are expressed.

What is claimed is:

1. A medical system, comprising: a left atrial appendage closure device including an expandable framework and a proximal hub disposed along a central longitudinal axis of the expandable framework, the expandable framework being configured to shift between a collapsed delivery configuration and an expanded deployed configuration; wherein the left atrial appendage closure device includes a sensor at least partially disposed within an interior of the expandable framework and axially movable relative to the proximal hub while the expandable framework is in the expanded deployed configuration, wherein the sensor is biased proximally; wherein the proximal hub includes a first threaded connection structure; and a delivery catheter including a core wire extending axially within a lumen of the delivery catheter, the core wire having a second threaded connection structure at a distal end thereof configured to releasably engage the first threaded connection structure in an unreleased configuration; wherein when the second threaded connection structure is disengaged from the first threaded connection structure, the sensor is at least partially disposed within the proximal hub.

2. The medical system of claim 1, wherein the sensor is a pressure sensor configured to sense a fluid pressure within a space facing a proximal end of the sensor when the left atrial appendage closure device is in a released configuration.

3. The medical system of claim 1, wherein when the second threaded connection structure is engaged with the first threaded connection structure, a distal end of the second threaded connection structure engages a proximal end of the sensor.

4. The medical system of claim 1, wherein when the second threaded connection structure is disengaged from the first threaded connection structure, a proximal end of the sensor extends proximal of the proximal hub.

5. The medical system of claim 1, wherein the left atrial appendage closure device includes at least one spring engaged with the proximal hub and the sensor.

6. The medical system of claim 5, wherein the at least one spring is one coil spring disposed coaxially about the sensor.

7. The medical system of claim 5, wherein the at least one spring is fixedly attached to an inner surface of the proximal hub.

8. A medical system, comprising: a left atrial appendage closure device including an expandable framework and a proximal hub disposed along a central longitudinal axis of the expandable framework, the expandable framework being configured to shift between a collapsed delivery configuration and an expanded deployed configuration; wherein the left atrial appendage closure device includes a sensor at least partially disposed within an interior of the expandable framework and axially movable relative to the proximal hub while the expandable framework is in the expanded deployed configuration, wherein the sensor is biased proximally; wherein the proximal hub includes a first threaded connection structure; and a delivery catheter including a core wire extending axially within a lumen of the delivery catheter, the core wire having a second threaded connection structure at a distal end thereof configured to releasably engage the first threaded connection structure in an unreleased configuration; wherein the sensor includes an annular ledge extending radially outward from an outer surface of the sensor.

9. The medical system of claim 8, wherein the annular ledge is axially closer to a distal end of the proximal hub in a released configuration than in the unreleased configuration.

10. The medical system of claim 9, wherein the annular ledge is configured to engage the proximal hub when the left atrial appendage closure device is in a released configuration.

11. The medical system of claim 8, wherein in a released configuration, the sensor occupies at least 70% of a volume defined by the first threaded connection structure.

12. A medical system, comprising: a left atrial appendage closure device including an expandable framework and a proximal hub disposed along a central longitudinal axis of the expandable framework, the expandable framework being configured to shift between a collapsed delivery configuration and an expanded deployed configuration; wherein the left atrial appendage closure device includes a sensor at least partially disposed within an interior of the expandable framework and axially movable relative to the proximal hub while the expandable framework is in the expanded deployed configuration, wherein the sensor is biased proximally; wherein the proximal hub includes a first connection structure; and a delivery catheter including a core wire extending axially within a lumen of the delivery catheter, the core wire having a second connection structure at a distal end thereof configured to releasably engage the first connection structure in an unreleased configuration; wherein an occlusive element is disposed over at least a portion of the expandable framework; wherein at least one spring is disposed between the proximal hub and the sensor in compression.

13. The medical system of claim 12, wherein the expandable framework includes a plurality of interconnected struts joined together at the proximal hub.

14. The medical system of claim 12, wherein the first connection structure is formed on an inside surface of the proximal hub and the second connection structure is formed on an outside surface of the core wire.

* * * * *